(12) United States Patent
Cole et al.

(10) Patent No.: US 10,065,308 B2
(45) Date of Patent: Sep. 4, 2018

(54) SYSTEMS AND METHODS FOR CHAIN JOINT CABLE ROUTING

(71) Applicant: Kurion, Inc., Irvine, CA (US)

(72) Inventors: Matthew Cole, Denver, CO (US); Paul Damon Linnebur, Johnstown, CO (US); Dan Alan Preston, Bainbridge Island, WA (US); Ken Schofield, Holland, MI (US)

(73) Assignee: Kurion, Inc., Irvine, CA (US)

( * ) Notice: Subject to any disclaimer, the term of this patent is extended or adjusted under 35 U.S.C. 154(b) by 0 days.

(21) Appl. No.: 14/975,544

(22) Filed: Dec. 18, 2015

(65) Prior Publication Data

US 2016/0176044 A1 Jun. 23, 2016

Related U.S. Application Data

(60) Provisional application No. 62/094,575, filed on Dec. 19, 2014.

(51) Int. Cl.
*B25J 9/10* (2006.01)
*B25J 9/12* (2006.01)
*B25J 9/14* (2006.01)
*B25J 19/00* (2006.01)
(Continued)

(52) U.S. Cl.
CPC ............. *B25J 9/104* (2013.01); *B25J 9/123* (2013.01); *B25J 9/144* (2013.01); *B25J 17/00* (2013.01); *B25J 19/0029* (2013.01); *B25J 19/0041* (2013.01); *F15B 15/06* (2013.01); *Y10S 901/09* (2013.01); *Y10S 901/21* (2013.01); *Y10S 901/28* (2013.01)

(58) Field of Classification Search
CPC ........ B25J 19/0041; B25J 9/104; B25J 9/123; B25J 9/144; Y10S 901/21
See application file for complete search history.

(56) References Cited

U.S. PATENT DOCUMENTS 4,697,472 A * 10/1987 Hiyane ...................... B25J 9/06
403/119
4,975,856 A * 12/1990 Vold ....................... B25J 9/1602
318/568.19

(Continued)

FOREIGN PATENT DOCUMENTS

DE 3641802 A1 6/1988
EP 0108657 A2 5/1984
(Continued)

OTHER PUBLICATIONS

International Search Report and Written Opinion of International Application No. PCT/US15/66926, dated Mar. 9, 2016; 15 pages.
(Continued)

*Primary Examiner* — Ryan J Rink
(74) *Attorney, Agent, or Firm* — Schwabe Williamson & Wyatt

(57) ABSTRACT

The present disclosure relates to cable routing approaches that allow cables to pass through a traditional chain joint without reducing the strength capacity or impairing the range of motion of the joint. The routing approaches permit the cables to be housed inside the structure of the robotic arm and pass through the chain joint in a manner that does not limit the width of the chain.

25 Claims, 29 Drawing Sheets

(51) Int. Cl.
*B25J 17/00* (2006.01)
*F15B 15/06* (2006.01)

(56) References Cited

U.S. PATENT DOCUMENTS

| | | | | |
|---|---|---|---|---|
| 5,293,107 | A * | 3/1994 | Akeel | B25J 9/08 310/83 |
| 8,118,805 | B2 * | 2/2012 | Jinno | B25J 9/104 606/1 |
| 8,562,049 | B2 * | 10/2013 | Ihrke | B25J 9/104 294/106 |
| 2004/0050200 | A1 * | 3/2004 | Baba | B25J 9/104 74/490.01 |
| 2007/0035143 | A1 * | 2/2007 | Blackwell | B25J 9/104 294/111 |
| 2010/0152898 | A1 * | 6/2010 | Reiland | B25J 9/1633 700/261 |
| 2010/0259057 | A1 * | 10/2010 | Madhani | B25J 9/1045 294/106 |
| 2011/0214524 | A1 * | 9/2011 | Jacobsen | A61F 2/68 74/490.04 |
| 2012/0095596 | A1 | 4/2012 | Cole | |
| 2013/0193704 | A1 * | 8/2013 | Ihrke | B25J 9/104 294/213 |
| 2013/0270399 | A1 * | 10/2013 | Berkowitz | B25J 19/0029 248/70 |
| 2013/0304084 | A1 * | 11/2013 | Beira | A61B 19/2203 606/130 |
| 2014/0217762 | A1 * | 8/2014 | Ihrke | B25J 9/104 294/198 |
| 2014/0222199 | A1 * | 8/2014 | Ihrke | B25J 9/104 700/253 |
| 2015/0289942 | A1 * | 10/2015 | Au | A61B 19/2203 606/130 |
| 2017/0067547 | A1 * | 3/2017 | Edsinger | F16H 48/12 |

FOREIGN PATENT DOCUMENTS

| | | |
|---|---|---|
| JP | S5516444 | 2/1980 |
| JP | H0615587 A | 1/1994 |
| JP | 2013091146 A | 5/2013 |
| WO | 2016/100939 | 6/2016 |

OTHER PUBLICATIONS

International Preliminary Report on Patentability for PCT/US15/66926; dated Jun. 29, 2017; 10 pages.

* cited by examiner

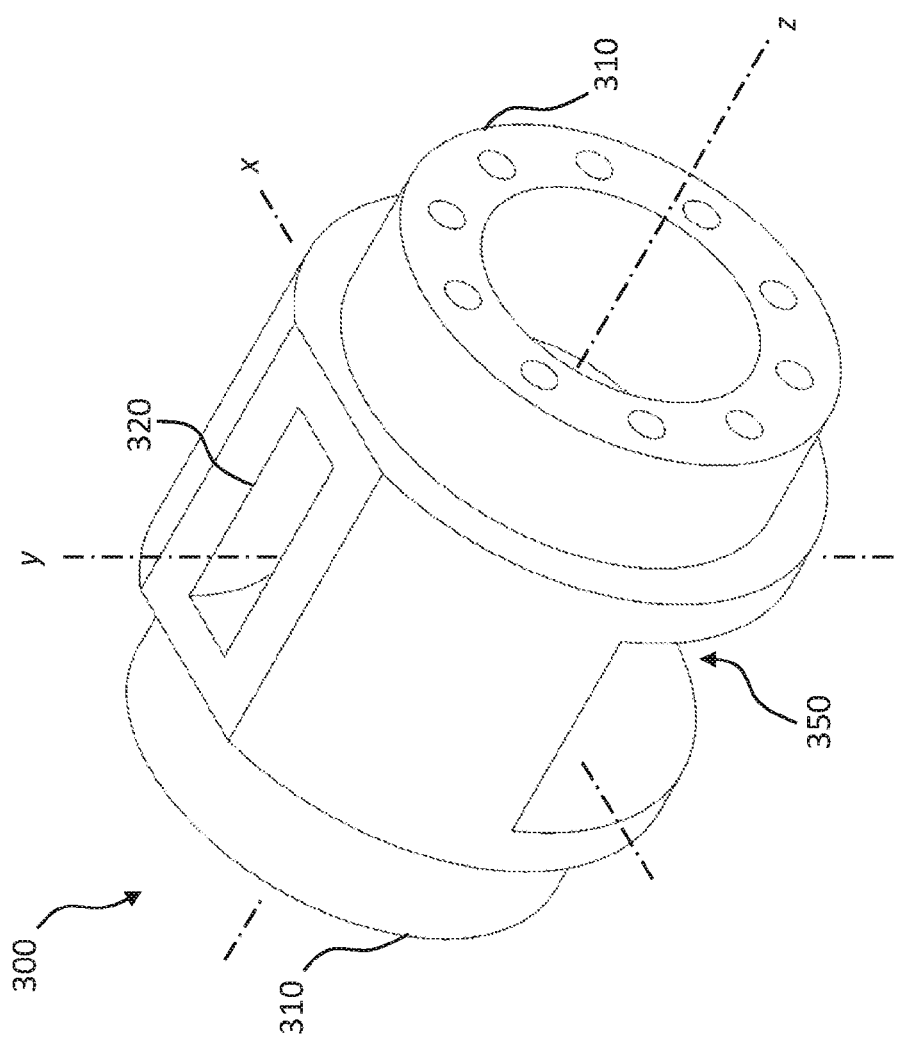

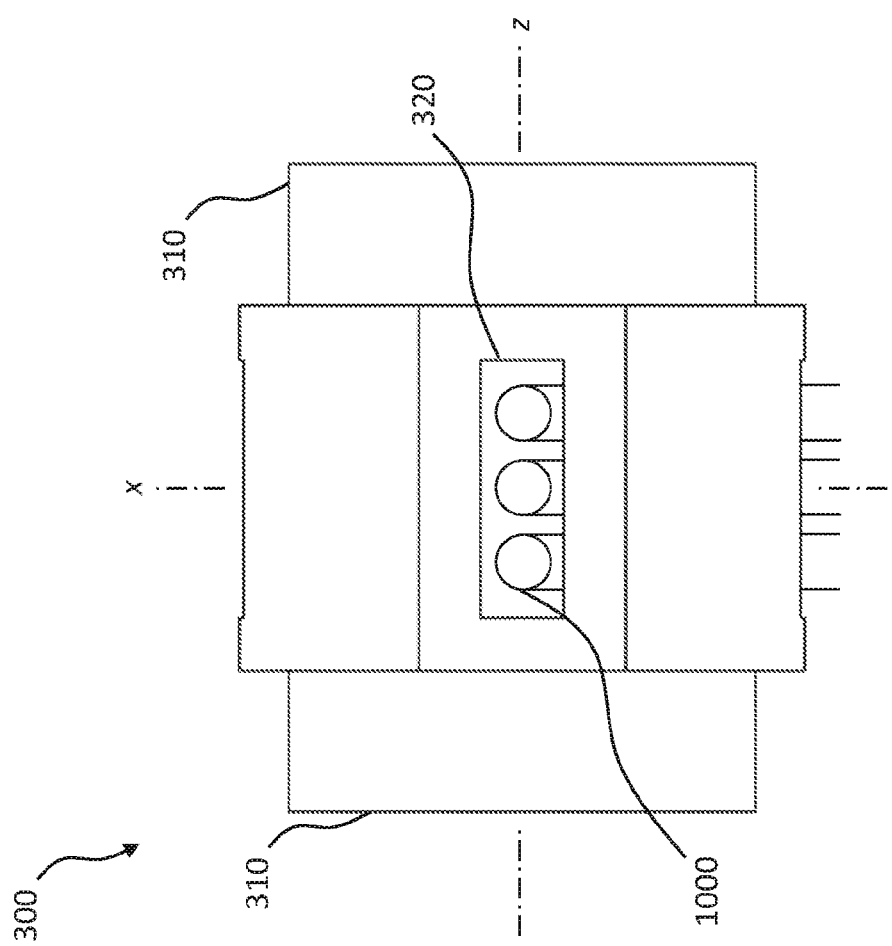

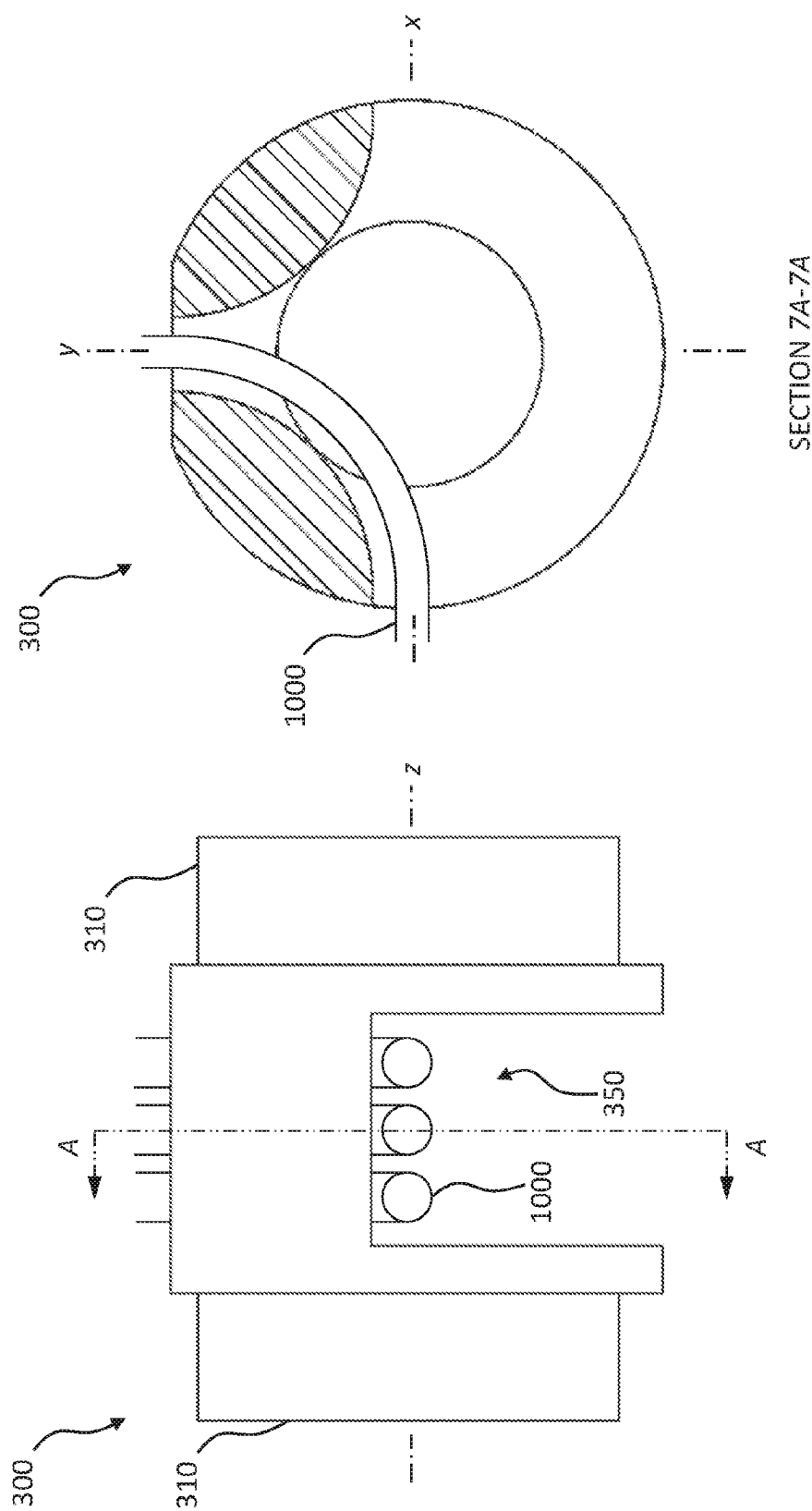

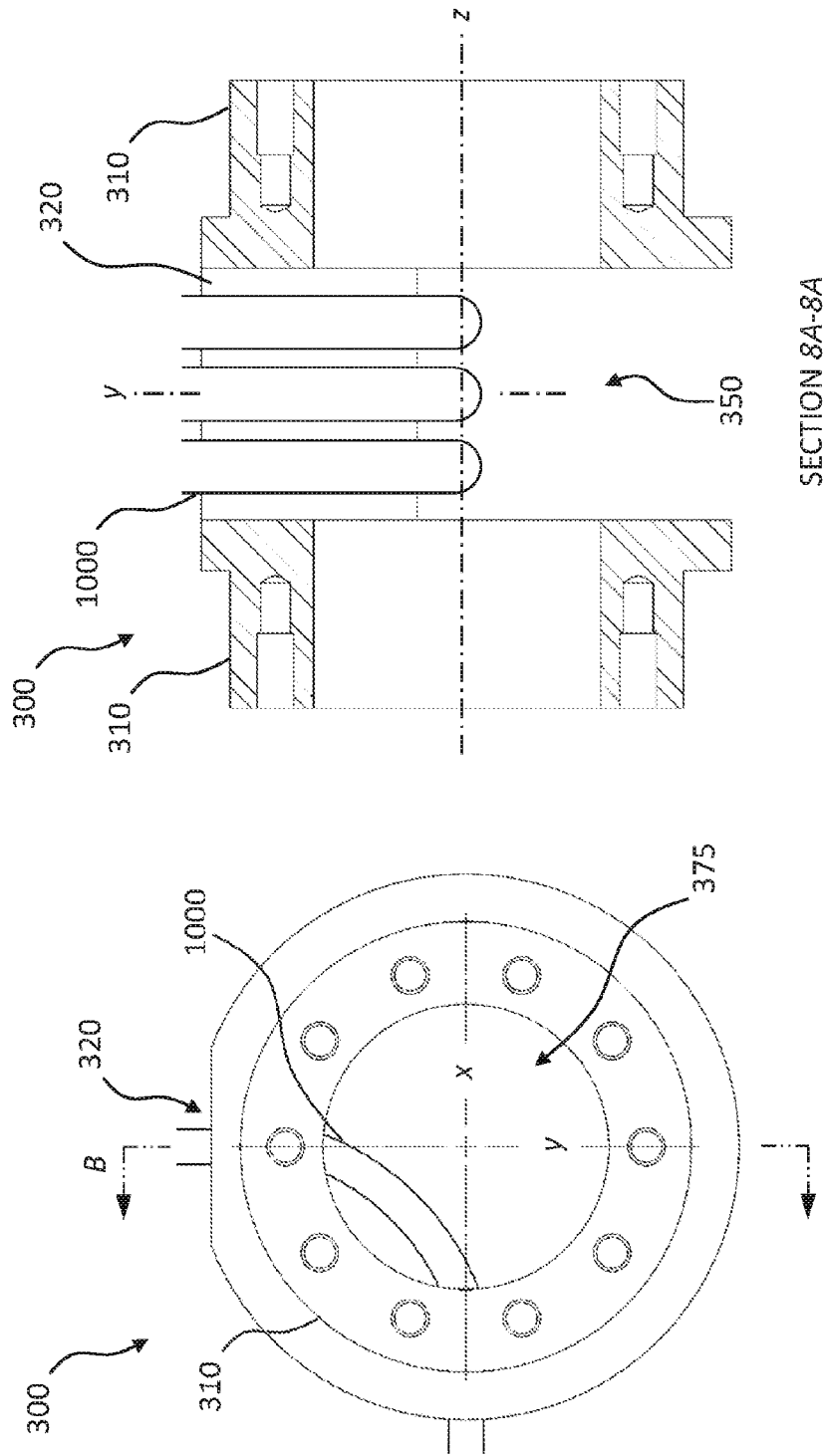

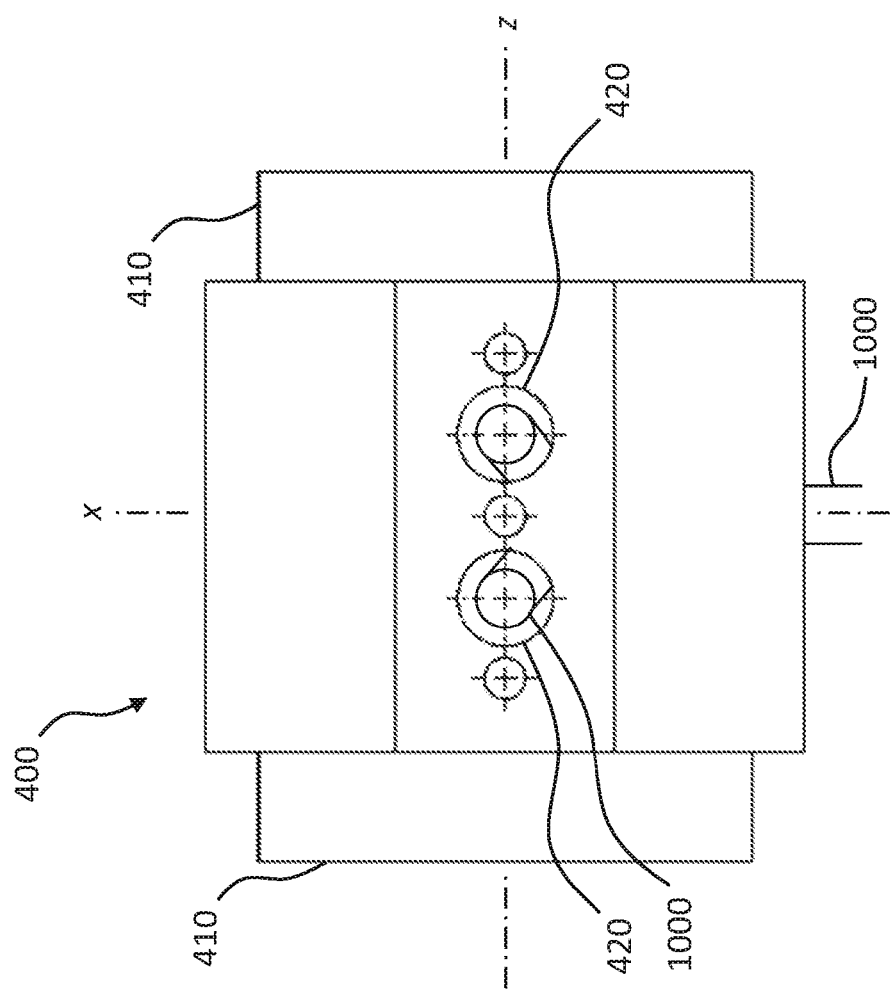

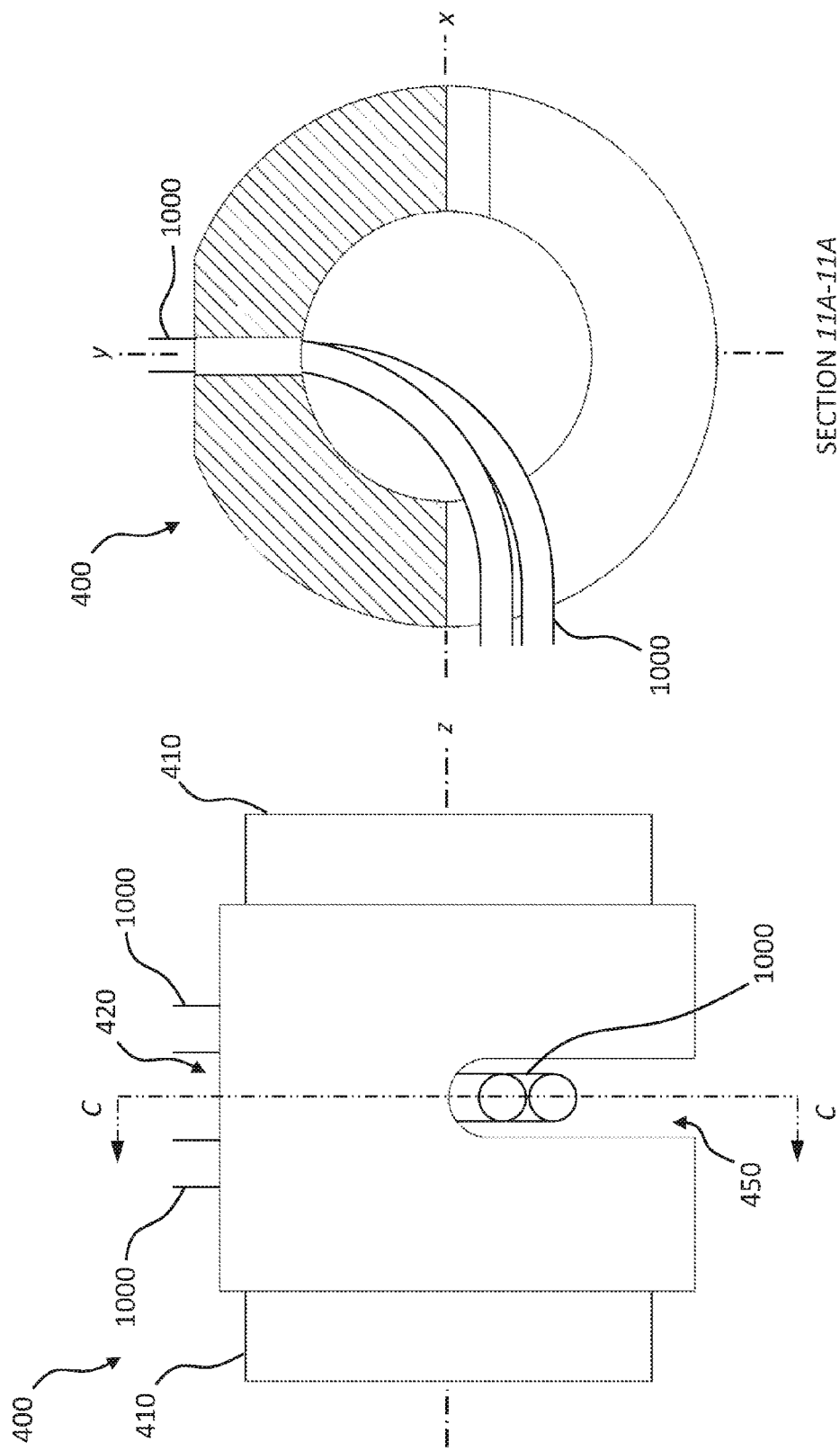

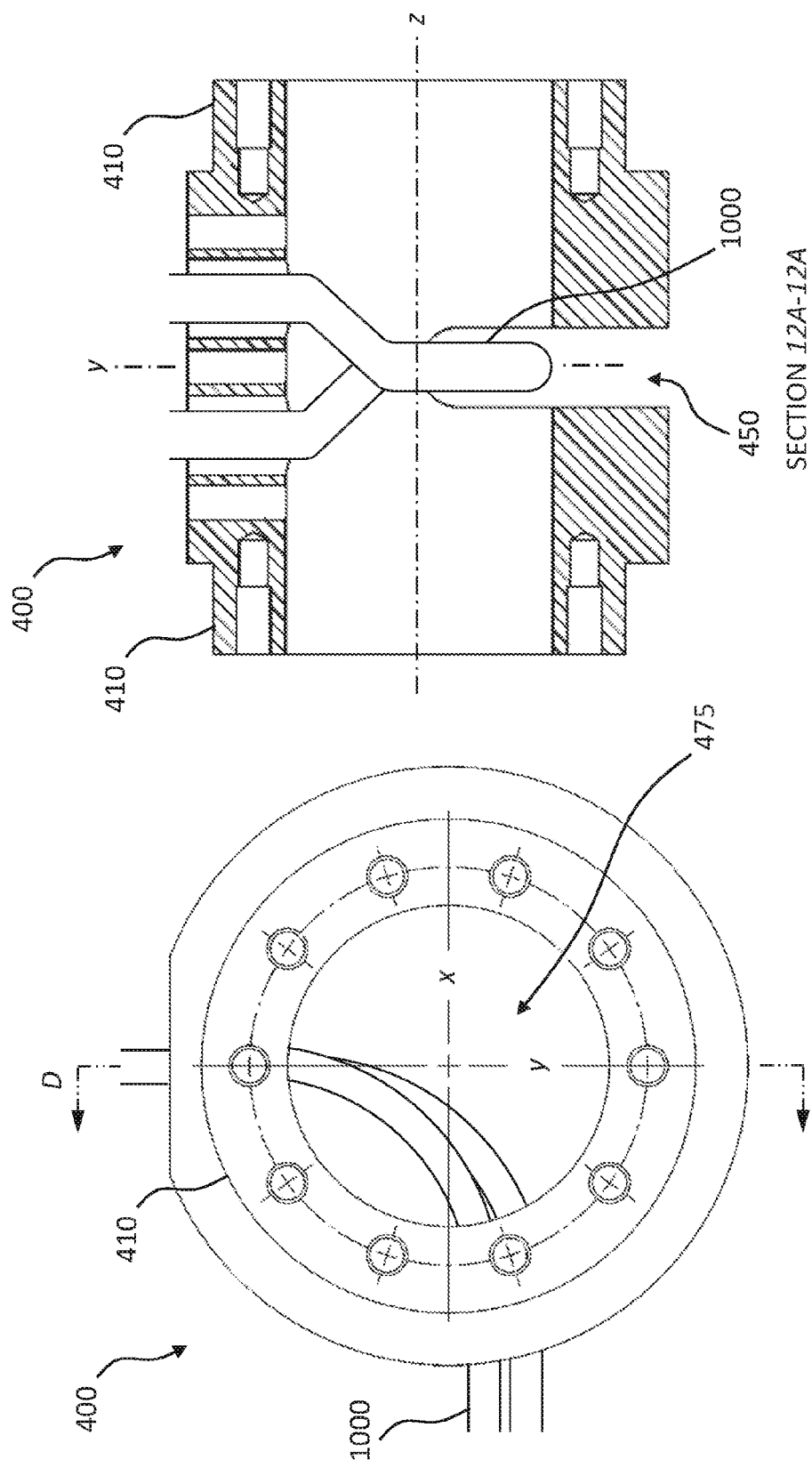

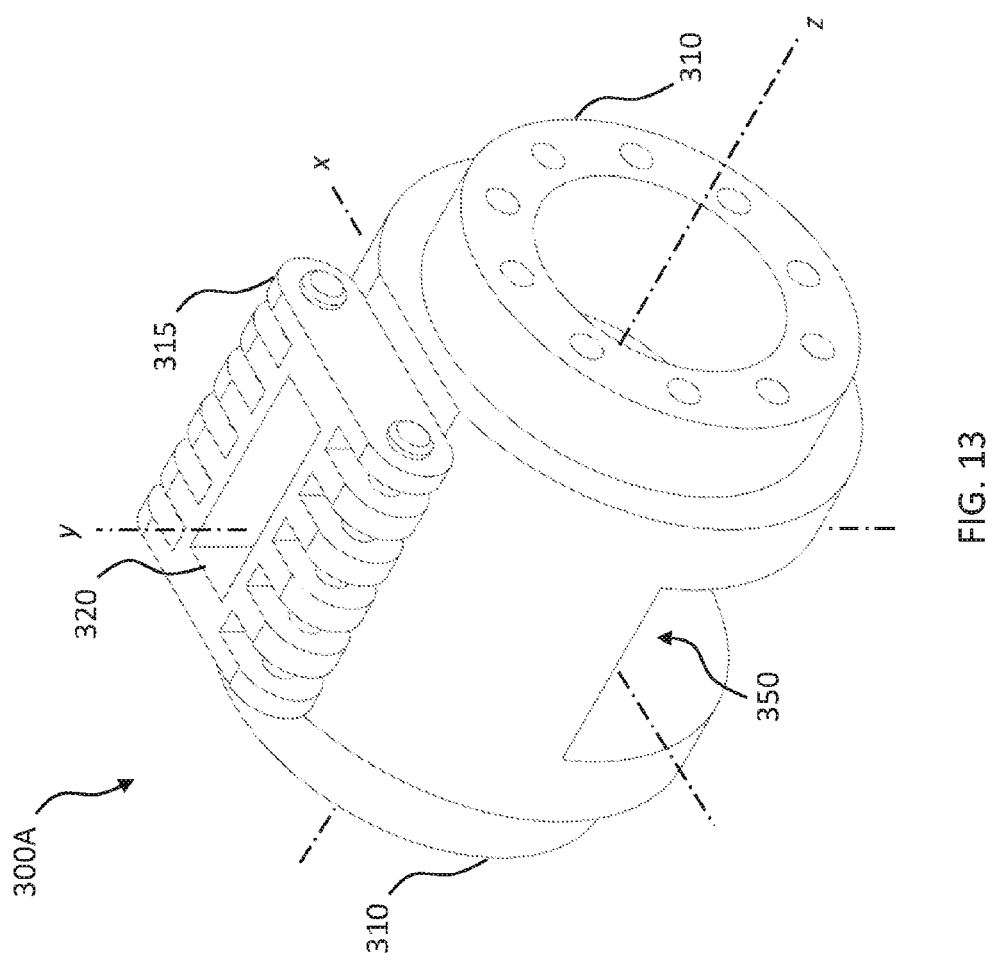

SYSTEMS AND METHODS FOR CHAIN JOINT CABLE ROUTING

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

TECHNICAL FIELD

This disclosure relates generally to robotic arm systems. More specifically, this disclosure relates to cable routing through robotic arm chain joints.

BACKGROUND

Cable routing is an important aspect of robotics design and operation. Often, cables are routed along the outside of robotic mechanisms which has disadvantages such as affecting the outer profile of the robotic system and potential for getting caught in objects in the environment, among other things. Internal cable routing has the potential disadvantages of increasing the profile of the robotic system, decreasing strength capacity, and increased joint size, among other things. Cables need to be routed in such a way as to prevent damage to the cables via twisting, bending, exposure, getting caught in joints, etc. as well as to avoid limiting the range of motion, strength capacity, etc. of the robotic mechanism. Advantages of internally routed cables are that they allow uniform profile and ability to seal the robotic system against liquids and gases, particularly in submersed operations. Solutions are needed to improve joint cable routing to eliminate risk of damage to the cables, while still maintaining the total strength capacity and range of motion of the chain joint. The present disclosure addresses these needs with embodiments comprising one or more of system sensor monitoring, wireless communication methods within the mechanism, and electronic control systems.

So as to reduce the complexity and length of the Detailed Specification, and to fully establish the state of the art in certain areas of technology, Applicant(s) herein expressly incorporate(s) by reference all of the following materials identified in each numbered paragraph below. The incorporated materials are not necessarily "prior art" and Applicant(s) expressly reserve(s) the right to swear behind any of the incorporated materials.

Applicant(s) believe(s) that the material incorporated above is "non-essential" in accordance with 37 CFR 1.57, because it is referred to for purposes of indicating the background or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

Aspects and applications of cable routing presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The use of the words "function," "means" or "step" in the Detailed Description or Description of the Drawings or claims is not intended to somehow indicate a desire to invoke the special provisions of 35 U.S.C. § 112, ¶6. To the contrary, if the provisions of 35 U.S.C. § 112, ¶6 are sought to be invoked to define the embodiments, the claims will specifically and expressly state the exact phrases "means for" or "step for, and will also recite the word "function" (i.e., will state "means for performing the function of . . . ), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed embodiments, it is intended that the embodiments not be limited only to the specific structure, material or acts that are described in the preferred embodiments, but in addition, include any and all structures, materials or acts that perform the claimed function as described in alternative embodiments or forms, or that are well known present or later-developed, equivalent structures, material or acts for performing the claimed function.

BRIEF DESCRIPTION OF THE DRAWINGS

A more complete understanding of cable routing may be derived by referring to the detailed description when considered in connection with the following illustrative figures. In the figures, like-reference numbers refer to like-elements or acts throughout the figures. Embodiments are illustrated in the accompanying drawings, in which:

FIG. 5A depicts an isometric view of a first embodiment for the hub.

FIG. 6 depicts a top view of the hub embodiment of FIG. 5A.

FIG. 7A depicts a front view of the hub embodiment of FIG. 5A.

FIG. 7B depicts section view 7A-7A of FIG. 7A.

FIG. 8A depicts a side view of the hub embodiment of FIG. 5A.

FIG. 8B depicts section view 8A-8A of FIG. 8A.

FIG. 10 depicts a top view of the hub embodiment of FIG. 9A.

FIG. 11A depicts a front view of the hub embodiment of FIG. 9A.

FIG. 11B depicts section view 11A-11A of FIG. 11A.

FIG. 12A depicts a side view of the hub embodiment of FIG. 9A.

FIG. 12B depicts section view 12A-12A of FIG. 12A.

FIG. 13 is an isometric view of the hub embodiment of FIG. 5A with the link end attached.

Elements and acts in the figures are illustrated for simplicity and have not necessarily been rendered according to any particular sequence or embodiment.

DETAILED DESCRIPTION

In the following description, and for the purposes of explanation, numerous specific details, process durations, and/or specific formula values are set forth in order to provide a thorough understanding of the various aspects of exemplary embodiments. It will be understood, however, by those skilled in the relevant arts, that the apparatus, systems, and methods herein may be practiced without these specific details, process durations, and/or specific formula values. It is to be understood that other embodiments may be utilized and structural and functional changes may be made without departing from the scope of the apparatus, systems, and methods herein. In other instances, known structures and devices are shown or discussed more generally in order to avoid obscuring the exemplary embodiments. In many cases, a description of the operation is sufficient to enable one to implement the various forms, particularly when the operation is to be implemented in software. It should be noted that there are many different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments. It is to be understood that other embodiments may be utilized and structural and functional changes may be made without departing from the scope of the description.

Mechanical Joints

Figure 1:
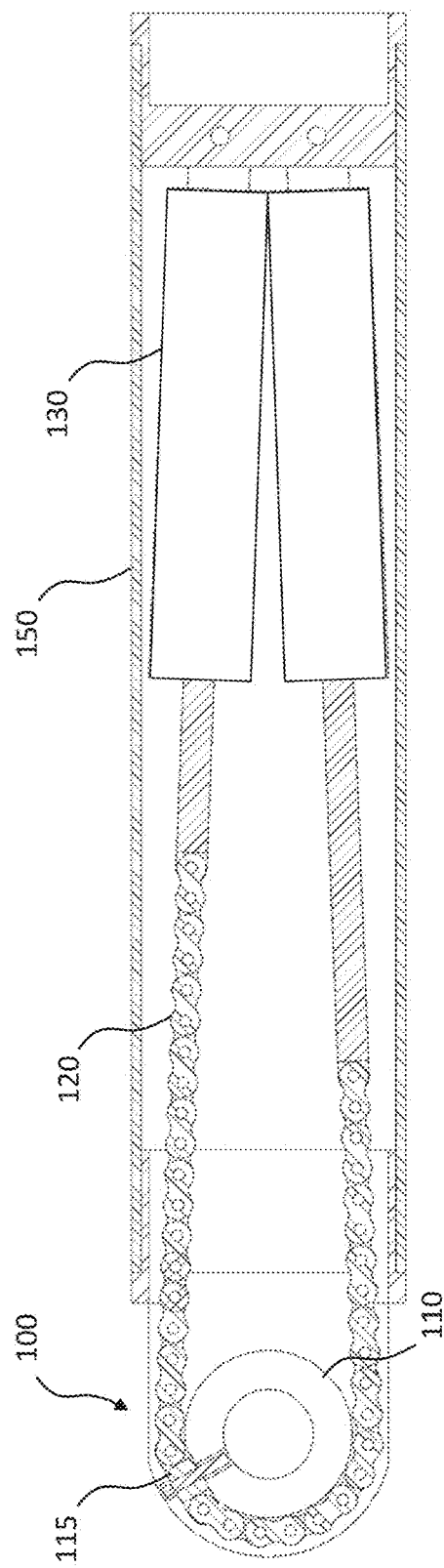
FIG. 1 depicts an exemplary view of a typical chain joint with angled actuators.
Figure 2:
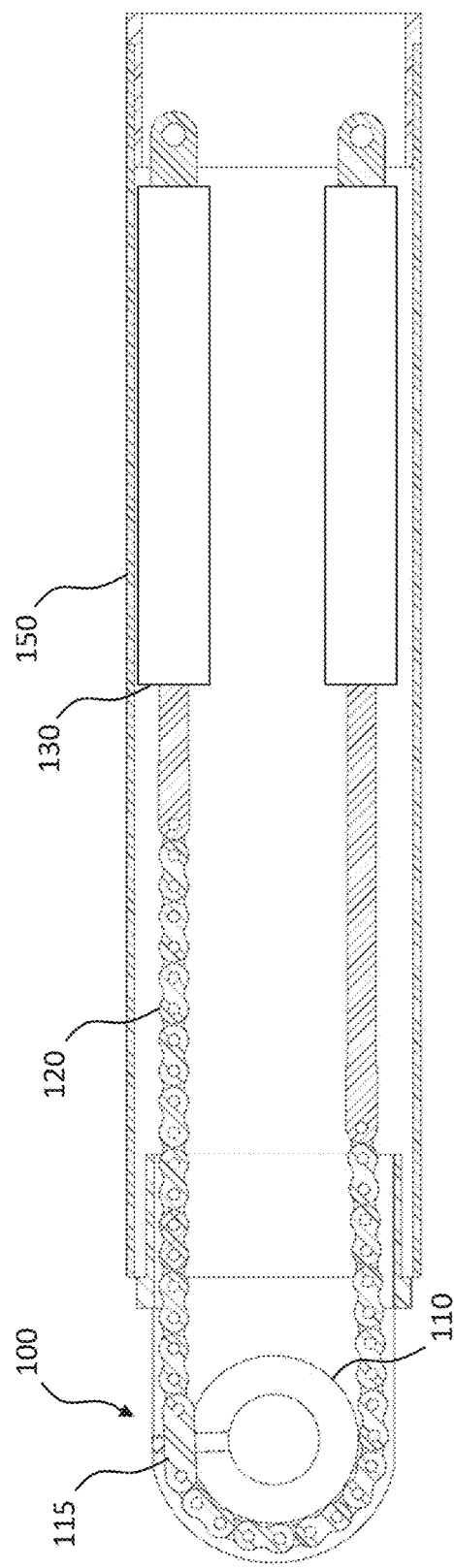
FIG. 2 depicts an exemplary view of a typical chain joint with parallel actuators.

FIGS. 1 and 2 are exemplary views of an actuating arm 150 comprising a mechanical joint with a flexible mechanical drive system. In the depicted embodiment the flexible mechanical drive system is a chain 120 and the mechanical joint is a chain joint 100. The actuating arm 150 further comprises a hub 110 and linear actuator(s) 130. The chain joint 100 is mounted between the actuating arm 150 and a moving arm 200 (FIG. 3). FIG. 1 depicts an embodiment having angled linear actuators 130 and FIG. 2 depicts an embodiment having parallel linear actuators 130.

In the depicted embodiment, the actuating arm 150 includes a chain joint 100 and one or more actuators 130. The chain joint 100 includes a hub 110, one or more chains 120, and a link end 115 (if two or more chains are used). The depicted embodiment comprises two chains 120; however, one or more chains 120 are possible. When one chain is used, the hub 110 comprises a sprocket, cog, gear, or one or more teeth to engage the chain. When two, or more, chains 120 are used the hub 110 either comprises or attaches to a link end 115. The link end 115 connects with one end of each of the chains 120 in the system and provides a pathway for the cable to route through the chain joint 100. There are many advantages to this design including high torque, slender design, self-tensioning, position holding, simplicity, constant torque, and 180° rotation.

Figure 3A:
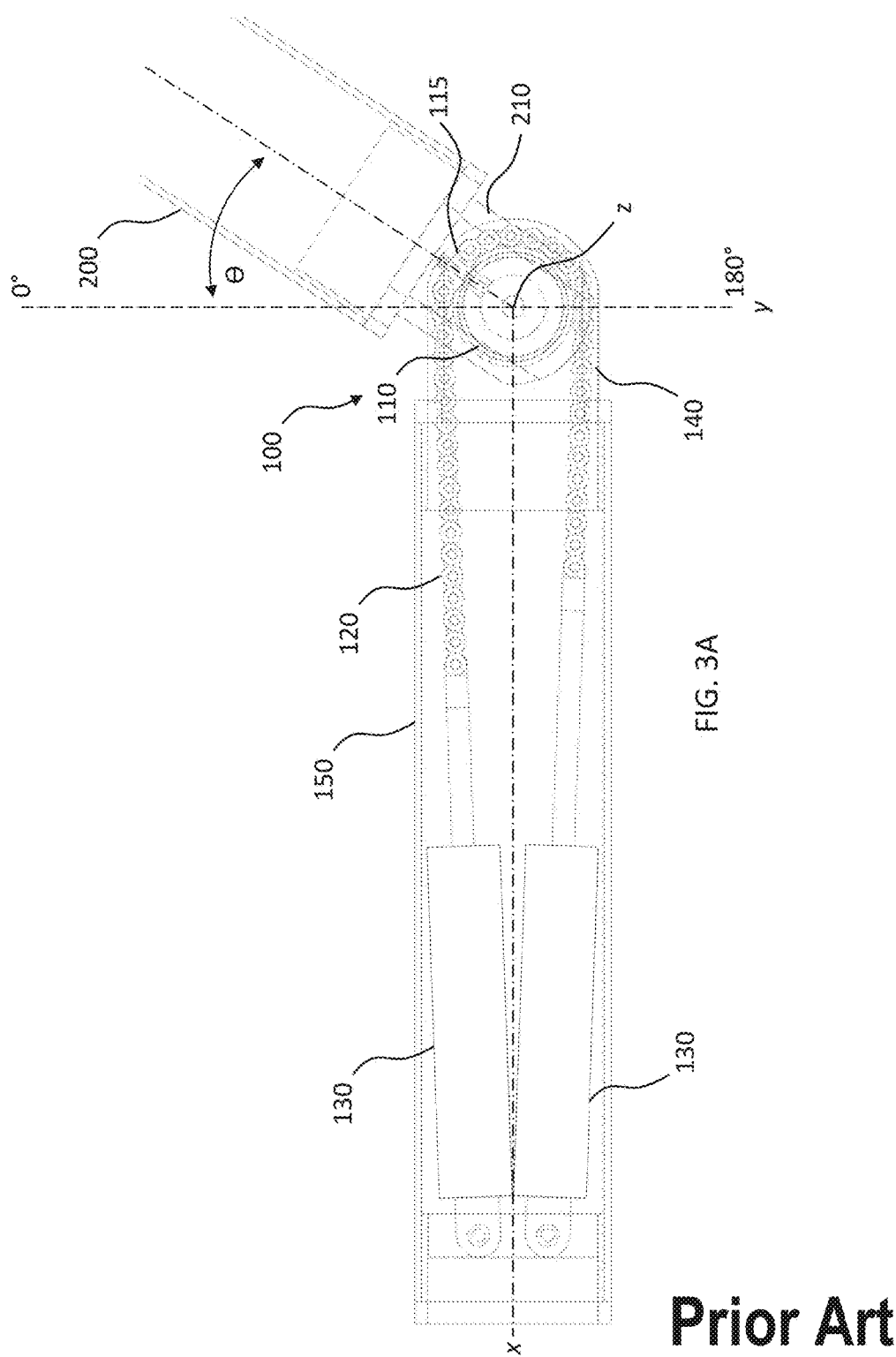
FIG. 3A depicts the chain joint of FIG. 1 being used to control motion of a robotic arm.
Figure 3B:
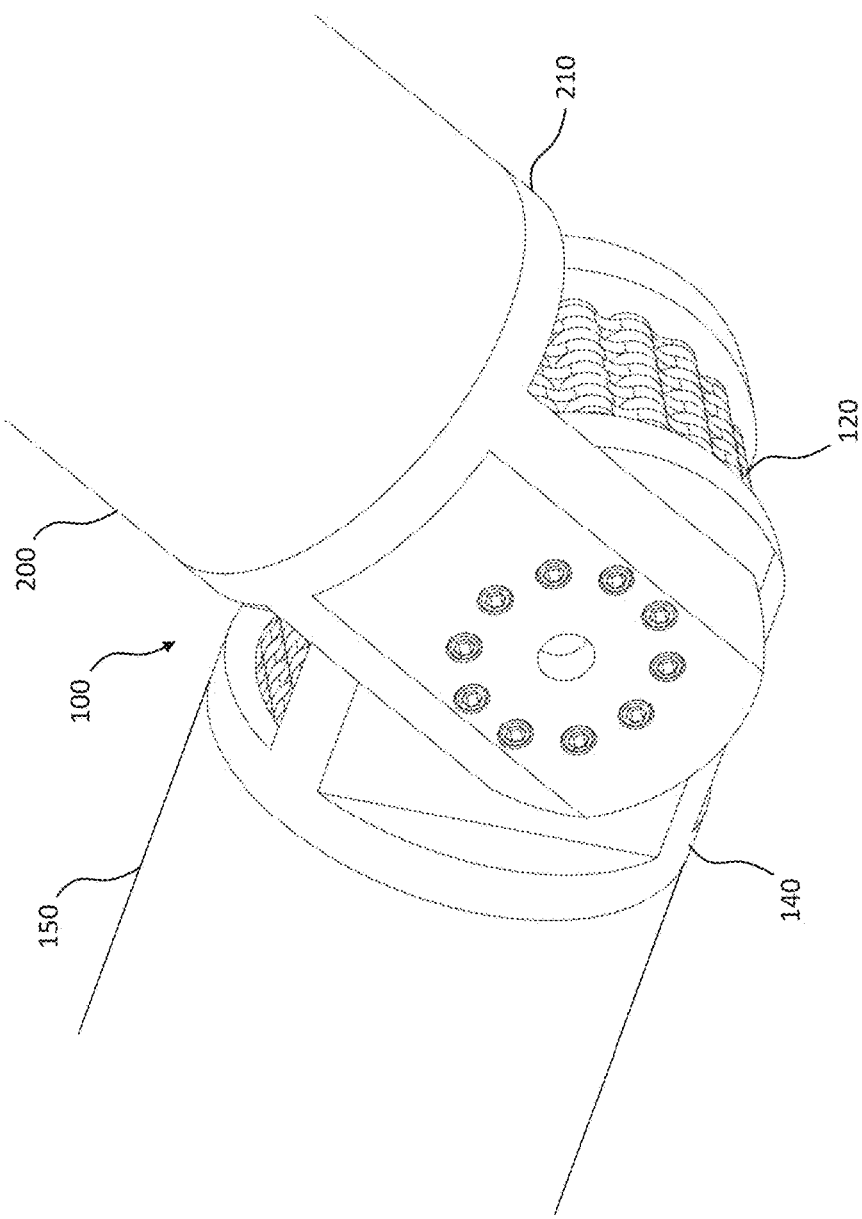
FIG. 3B depicts an isometric view of the joint showing the ear attachments.

FIGS. 3A and 3B depict the actuating arm 150 of FIG. 1 with a connected robotic arm, the moving section 200. The moving section 200 may be a single arm or several arms including one or more actuating arms. The moving section 200 is attached to external ears 210 that fit over internal ears 140. The external ears 210 are fastened to the hub 110. The hub 110 fits into bearings 250 (FIG. 5B) which are mounted in the internal ears 140. As the actuators 130 are actuated the moving section 200 moves within the 180° range shown with respect to the central axis, x, of the actuating arm 150. In some embodiments the actuating arm 150 is fixed. In some embodiments the actuating arm 150 is mobile. Regardless of if the actuating arm 150 is fixed or mobile, the moving section 200 moves in the 180° range shown perpendicular to the central axis, x, of the actuating arm 150 for embodiments having two links, belts, or chains of the same length.

Usage of the terms "attached", "connected", "fastened", "joined", or "coupled" herein shall refer to parts that have been put together in such a way as to render them fixed to each other unless the term is otherwise modified. For example, "temporarily attached" shall refer to components that couple and uncouple as the system is in motion. An example of "temporary attachment" is a sprocket and a chain. The portion of the chain that is attached to the sprocket changes during movement thus making the attachment between the sprocket and a portion of the chain temporary. However, the sprocket is constantly attached to the chain as a whole even if it is only temporarily attached to a particular portion of the chain.

The terms "engage" and "disengage" are intended to apply to components that regularly connect and disconnect i.e. are not fixed to one another. As a general example, a bicycle gear engages a bicycle chain. Different gears may engage with the chain.

Additionally, the terms "attached", "connected", "fastened", "joined", or "coupled" shall be construed to include any intervening parts necessary to facilitate the connection between the components. For example, the external ears 210 are connected to the hub 110 using a number of fasteners. Because the type and amount of fasteners or other intervening parts necessary is at least partially dependent on the scale, material(s), and intended application of the robotic mechanism, not all of the fasteners or intervening parts are described explicitly.

Actuators

In some embodiments, described in more detail below, the joint 100 may be actuated by one or more linear actuators 130 comprising mechanical, electro-mechanical, hydraulic, electric over hydraulic, pneumatic, magnetic, piezoelectric, and linear motor actuators. Mechanical actuators may comprise one or more screws, wheels axles, and cam actuators. Electro-mechanical actuators comprise mechanical actuators in which the manual controls are replaced with an electric motor and electronic control mechanism. Other types of actuators are contemplated including underwater linear actuators such as those produced by UltraMotion (ultramotion.com).

In some embodiments, the chain joint 100 may be actuated by one or more hydraulic cylinders. Other embodiments with hydraulic actuators may include one or more hydraulic cylinders. In some embodiments the hydraulic cylinders may be linear. The styles and sizes of the one or more hydraulic cylinders are dependent on the scale and intended purpose of the system. Any style may be used for the hydraulic cylinders of the chain joint 100 including tie rod style cylinders and welded body style cylinders, among others.

In some embodiments having more than one actuator, the actuators 130 may function along a path that is not parallel to the central axis of the actuating arm 150, as depicted in FIG. 1. In other embodiments having more than one actuator, the actuators 130 may function parallel to the central axis of the actuating arm 150, as depicted in FIG. 2.

The Flexible Mechanical Drive System

The flexible mechanical drive system is configured to rotate the hub 110 about its central axis (z) resulting in a change of position between the actuating arm 150 and the moving arm 200 from a first position to a second position. As mentioned above, flexible mechanical drive system may comprise one or more chains 120. In other examples actuator (s) 130 may connect to hub 110 with cogs, gears, links, or belts. Cogs and gears may be machined or cast. Links, belts, and chains may be any material, type, width, and thickness as required for the system scale and application. It should be noted that various embodiments may comprise one or more links, belts, or chains of different lengths and widths depending on the scale of the robotic system and its intended application.

When one or more sections of links, chains, or belts are employed, different lengths may be used for embodiments requiring the moving section 200 to move in a range having an acute angle with one edge of the actuating arm 150 and an obtuse angle with the opposite edge of the actuating arm 150. As an example, the moving section 200 may have a range between 45° of the top of the actuating arm 150 and 135° from the bottom of the actuating arm 150 rather than the 90° range from both sides of the actuating arm 150 shown in FIG. 3A.

Chains

The following disclosure will describe an embodiment as depicted in the accompanying figures. In the depicted embodiments the flexible mechanical drive system comprises of chain 120 and a link end 115 connecting the chain 120 to the hub 110. Chains may be used for applications requiring high mechanical strength. Leaf chains have high tensile strength. Increasing the width of the chain increases the tensile strength of the chain. The chains 120 in FIGS. 1-3 may be metal leaf chains though other chain types comprising link and roller are contemplated.

The number of links forming each chain 120 may be dependent on factors such as the overall length of the arm, desired mechanical strength, and range of motion, among other things. The depicted embodiment comprises two separate chains 120, each comprising multiple links. In one example both chains 120 are the same length, however other embodiments may comprise two or more chains 120 of different lengths.

The term link refers to each separate section of chain wherein the sections of chain are the pieces or assembly of pieces that are fixed with respect to each other. When two links are coupled, each link is fixed with respect to its components and mobile with respect to the coupled link wherein the motion between the two links occurs at the connection point. In one example, a link is a rigid, movable piece or rod, connected with other parts by means of pivots or the like, for the purpose of transmitting motion.

Industrial chains are subject to abrasion wear, and typically require regular lubrication. Standard chain lubrication practices generally consist of applying a heavy oil or grease to the outside of the chain. While this adequately lubricates the sprockets and the outside of the chain, it typically does not protect the contacting surfaces inside the pin and bushing, plate, roller, and/or hook. The majority of chains fail from the inside. The chains may stretch or kink up due to wear and corrosion wear inside the pin and bushing area. To lubricate them properly, the lubricant should be engineered to penetrate and clean the inside of the chain to remove contaminants and displace any trapped water, and leave behind a heavy film of oil, grease or solid lubricant. Generally, a penetrating-type chain lubricant not only displaces water, but also cleans dirt and metal particles out of the pins of the chain and off of the sprockets.

The operating conditions (including load, environment, temperature and speed) may also be considered. The lubricant may be applied manually or automatically. In some embodiments the lubricant may be aimed directly into the pin and bushing area. Lubrication is used between the rollers and bushings, but other areas to lubricate are the pin and bushing surfaces, which articulate with each other while the chain is under full load. To reach all of these surfaces, the lubricant may be applied to the upper edges of the link plates on the lower strand of the chain shortly before the chain engages a sprocket. Then, as the chain travels around the sprocket, the lubricant is carried by centrifugal force into the clearances between the pins and the bushings. Spillage over the link plates supplies lubricant to the interior and the end surfaces of the rollers.

In some embodiments, a sufficiently low viscosity lubricant is used to reach the internal surfaces. A carrier solvent or penetrating component helps to achieve this without lowering the operating viscosity. In some embodiments, solid lubricants can help maintain the lubricating film under the bearing pressure. The lubricant should have the ability to maintain lubricating qualities under different temperatures, moistures, and environments containing particulate matter.

Potential Applications

Still referring to FIGS. 1-3, in an embodiment, the chain joint 100 may be used in a robotic arm apparatus. The moving section 200 of the robotic arm may be lowered by retracting a bottom actuator 130, creating rotation of the hub 110. In some embodiments, the chain joint 100 may be a component of a larger apparatus. Specific applications of the chain joint 100 may include, but are not limited to, an elbow joint, a shoulder joint, and a wrist joint. In some embodiments the actuating arm 150 is fixed and only the moving arm 200 is dynamic. In some embodiments both the actuating arm 150 and the moving section 200 are dynamic.

Cable Routing

Cables may run through mechanical drive system. The term "cable" is intended to comprise electrical wiring, hydraulic hoses, pneumatic hoses, fiber optic cable, communications cable, or any other cables, wires, or lines as well as bundles thereof. The cables may be used to transfer/transmit data pertaining to sensing and/or control in the system or any extensions attached to the system.

There are several design challenges around internal cable routing for robotic chain joints. One issue is the amount of space available within the arm, and more particularly the joint, for the cable to route through. One proposed solution to this issue is to route the cables alongside the chain. In this iteration, the width of the chain either has to be reduced or the overall width/diameter of the robot arm has to be increased. The total drive power of the joint is proportional to the width of the chain therefore reducing the chain width also reduces the drive power or joint strength. Increasing the overall profile of the robotic arm increases the weight and the amount of material to manufacture thus increasing the cost of assembly and utilization of the robotic arm.

Cabling

The amount and type of cabling, including coatings and sheathing, used in the cable joint 100 depends on many factors including type and number of actuator(s), type and number of sensor(s) and their location, intended use and environment, overall system size (i.e. number of joints to be controlled), and the location of the specific joint in a multi-joint system, among other things.

Minimum Bend Radius

Figure 4:
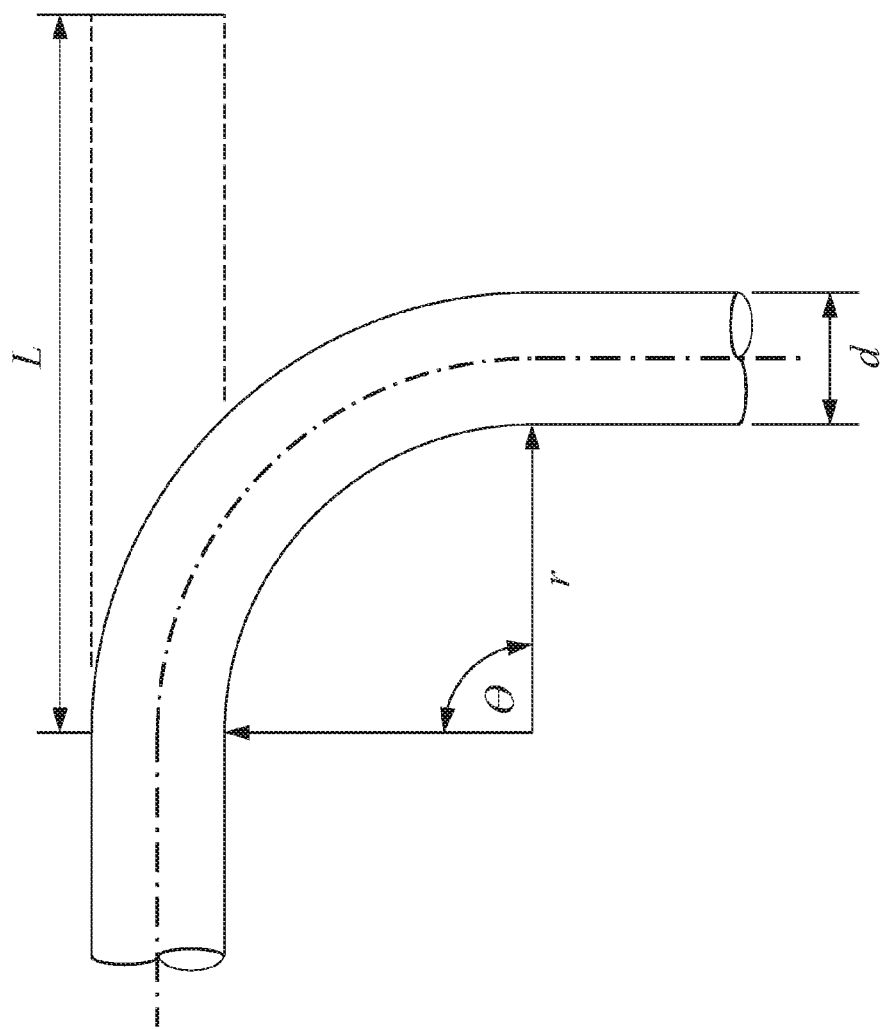
FIG. 4 depicts the variables required to determine cable bend length.

The minimum cable bend radius may be a significant factor in cable routing design. If cables and hoses are bent beyond their minimum bend radius the cables may be damaged and/or have a reduced life span. Bend radius refers to the surface of the cable on the inside of the bend, as shown in FIG. 4. Some discussion is provided below regarding typical minimum bend radius rules and calculations for some of the anticipated cable types.

Most cables are provided with minimum bend radius data. However, if the data is unavailable there are tables that can be referenced to determine the theoretical minimum bend radius depending on a number of factors. An exemplary generic table for power and control cables is provided below:

| Type | Min Bending Radius |
| --- | --- |
| Single or multiple conductor cables - no metallic shielding | 8 × the overall cable diameter |
| Single conductor cable - with metallic shielding | 12 × the overall cable diameter |
| Multiple conductor cables - with individually shielded conductors | 12 × the individual cable diameter or 7 × the overall cable diameter (whichever is greater) |
| Fiber Optic Cables | 6 × (<5000 V rating); 8 × (>5000 V rating) |

More detailed tables are readily available and should be referenced for specific applications.

Another aspect of cable bending is the minimum length of cable required to make the bend. The general formula to determine bend length is:

$$\frac{\theta}{360°} \cdot 2\pi r = L \quad (1)$$

where θ is the desired bend angle in degrees, r is the given bend radius of the hose, and L is the minimum bend length. If the desired bend angle occurs in less than the minimum bend length the cable and/or shielding can be damaged. The formula most specific to the application is used to determine minimum bend length. Some formulas may include the diameter of the cable, d. When multiple equations are used and one is unsure of which result is most accurate, one may generally use the largest of the calculated minimum bend lengths.

Additionally, coatings, shielding, and hose materials will affect the minimum cable bend radius and may be taken into account.

Other Cable Design Considerations

Cables are vulnerable at connection points. Typically connectors are rigid and cables are flexible. The interface between a rigid connector and a flexible cable creates a "stress riser". A "stress riser" is essentially an edge which concentrates a damaging force on the cable. In some cases, pulling the cable at a right angle to the axis of the connector ferrule can even damage the termination or the connector itself.

One or more cables may be wrapped in one or more bundles. How the one or more cables are bundled is dependent on the application, number of cables, cable bend radii, and cable types, among other things. Cable bundles and/or any single wires may be kept separate to prevent them from chafing each other. Sharp points and corners may be avoided in areas through which cables are routed to avoid binding, pinching, and breakage. Regular contact with the cables may be avoided if possible and any contact points may be smooth and rounded to reduce friction and scraping of the cables. Additional design considerations include avoiding unnecessary bends and routing through tight spaces particularly long tight spaces. Unnecessary bends increase stress on the cables and length of cable required. Routing through tight spaces increases the likelihood of binding, pinching, and jamming.

A standard cable clamp assembly may be securely and quickly attached to prevent sliding and chafing in slots. In an embodiment, two identical, symmetrical half arm clamps which make up the arm clamp assembly mate around the cable and exert a grasping force which can be adjusted to the desired level. The symmetry and substantially identical form of the half arm clamps allows for greater interchangeability of parts and assembly with less regard for the orientation of the half arm clamps. For some embodiments, an asymmetrical half arm clamp arrangement may also be desirable. Dividers between hoses and other cables may be clamped at a link point. Clamp assemblies and dividers help control the location of the stress, and manage where the stress occurs. In some embodiments the cable and clamp configuration will allow for flexing or length change by including a simple loop in the cable, with the loop allowing for available slack when needed. However, in some embodiments a slack loop is not desirable due to the potential to catch or get hung up on equipment protrusions in the system; in some embodiments the solution is to control where the flexing happens, which may eliminate the need for a slack loop.

Design Details

The general system as shown and described in FIGS. 1, 2, and 3 contains components used in the various embodiments disclosed herein. The depicted embodiments allow for a full width chain to be used with internal cable routing without the mechanical disadvantages of existing systems. The hub 110 is one component affected by internal cable routing. The hub may comprise one or more cable routing passages configured to allow cable passage through the hub from the actuating arm to the moving arm.

In some embodiments at least one of the width or diameter of the hub is less than the width or diameter of the profile of the moving arm. In these embodiments, the joints between the arms will have the same or smaller profile as the arms thus streamlining the overall system profile. These embodiments are particularly useful in applications requiring the robotic arm to extend through a small rigid opening or into a cramped space as well as applications requiring environmental containment.

In some embodiments, the profile of each arm may vary such as each additional arm decreasing in size from the previous arm. In some embodiments where the hub joins two arms of different profiles and/or sizes, the hub will have a smaller width or diameter than the arm having the smaller or more constrained profile.

The Hub

The hub 110 is the component at the center of the pivot point for the chain joint 100. As the one or more actuators are actuated the chain 120 causes the hub 110 and attached moving section 200 to move within a range of 180° along they-axis wherein the 180° range is perpendicular to the hydraulic side of the joint, as depicted in FIG. 3A.

The relationship between the views of the hub that will be depicted in the following figures with respect to the joint and motion thereof is as follows: the top view of the hub is aligned with the central axis of the moving section 200 of the robotic arm; the side view of the hub is taken along the plane on which the motion of the arm occurs; the front view of the hub is the view taken from along the axis of the actuating arm 150 when the moving section 200 of the robotic arm is perpendicular.

Embodiment 1

Figure 5B:
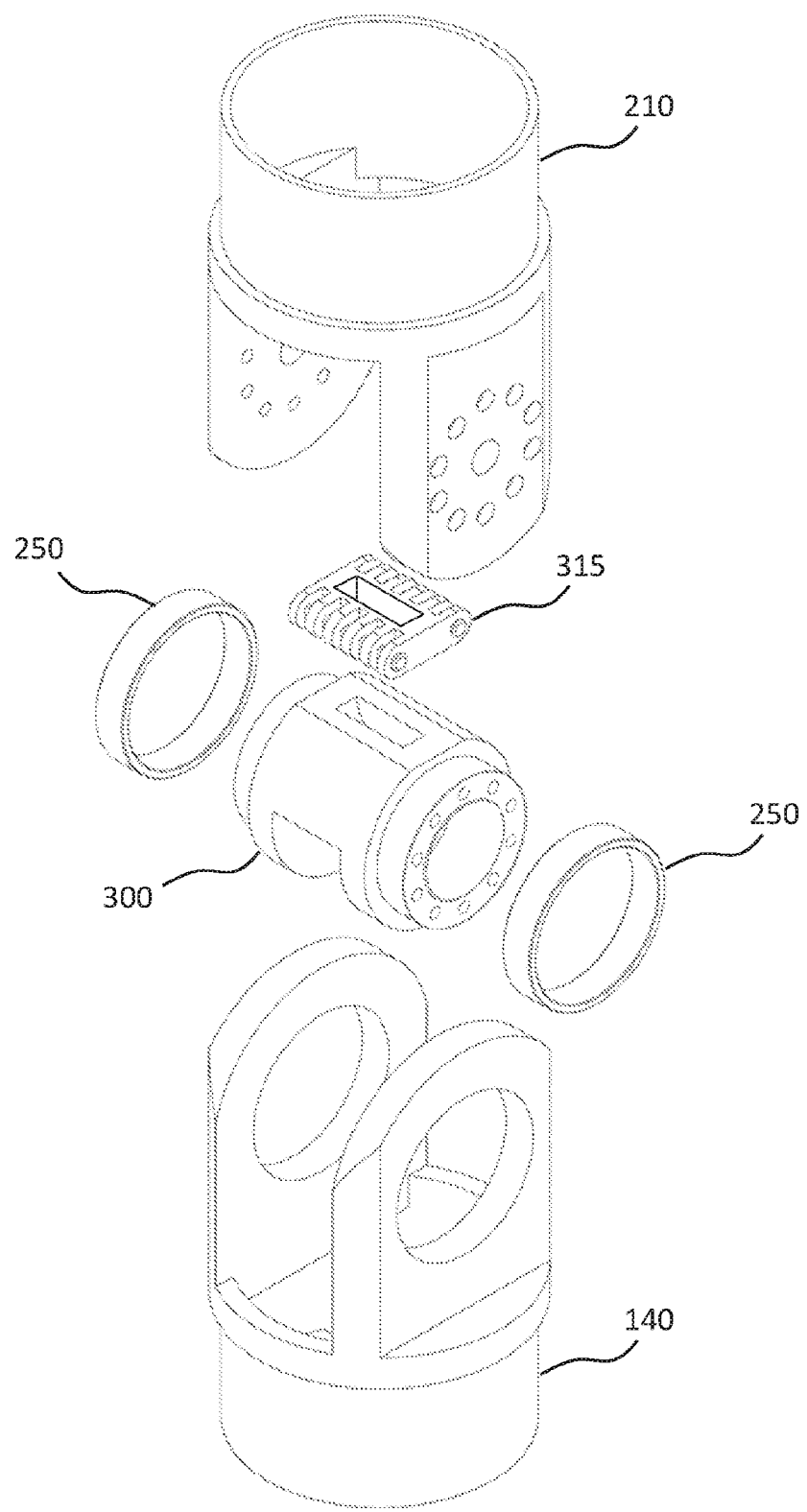
FIG. 5B depicts and exploded view of the mechanical joint with the hub embodiment of FIG. 5A.

An embodiment of the hub is depicted in FIGS. 5A to 8. FIG. 5A depicts an isometric view of the hub 300. The hub 300 comprises sides 310, top cable guide 320, and bottom cable slot 350. The diameter of sides 310 are dependent on the scale of the system and the bearings 250 (FIG. 5B) used between sides 310 and the inner ears 140 (FIG. 2). The diameter of sides 310 will be the same on both sides in most embodiments. Depending on the material and assembly methods for the robotic mechanism, one or both of sides 310 may be separate pieces from the hub 300 and fastened.

FIG. 5B depicts an exploded view of the mechanical joint 100. The sides 310 of the hub 300 fit into the bearings 250 which fit into the internal ears 140. The external ears 210 fit over the internal ears 140 and are fastened to the hub 300. The link end 315 is fastened to the top of the hub 300. Chain 120 (FIGS. 1-3) is fastened to each side of the link end 315. A variety of types and sizes of fasteners and fastener methods may be used depending on the scale and intended application therefore fasteners and fastening methods have been omitted from the figures.

FIG. 6 depicts a top view of the hub 300 showing the top cable guide 320 through which the cable 1000 is routed. In the figure three cables are shown however other numbers of cables 1000 are possible depending on the actuators, sensors, and other factors previously identified.

FIG. 7A depicts a front view of hub 300. FIG. 7B depicts section view 7A-7A of FIG. 7A. The cables 1000 are routed down through the top cable guide 320 around through the bottom cable slot 350.

FIG. 8A depicts a side view of hub 300. FIG. 8B depicts section view 8A-8A of FIG. 8A. FIGS. 8A and 8B show cable 1000 routing down through the top cable guide 320 around through bottom cable slot 350. In the depicted embodiment of the hub 300, the cables are routed parallel to each other and remain side by side through the hub 300.

Depending on the scale, application, actuators, and number of cables 1000, a larger amount of cable 1000 may be looped into the central region 375 of the hub 300 to prevent the cable from bending beyond its bend radius and from stretching too tightly when the moving section 200 (FIG. 3) is at the outermost ranges.

Embodiment 2

Figure 9A:
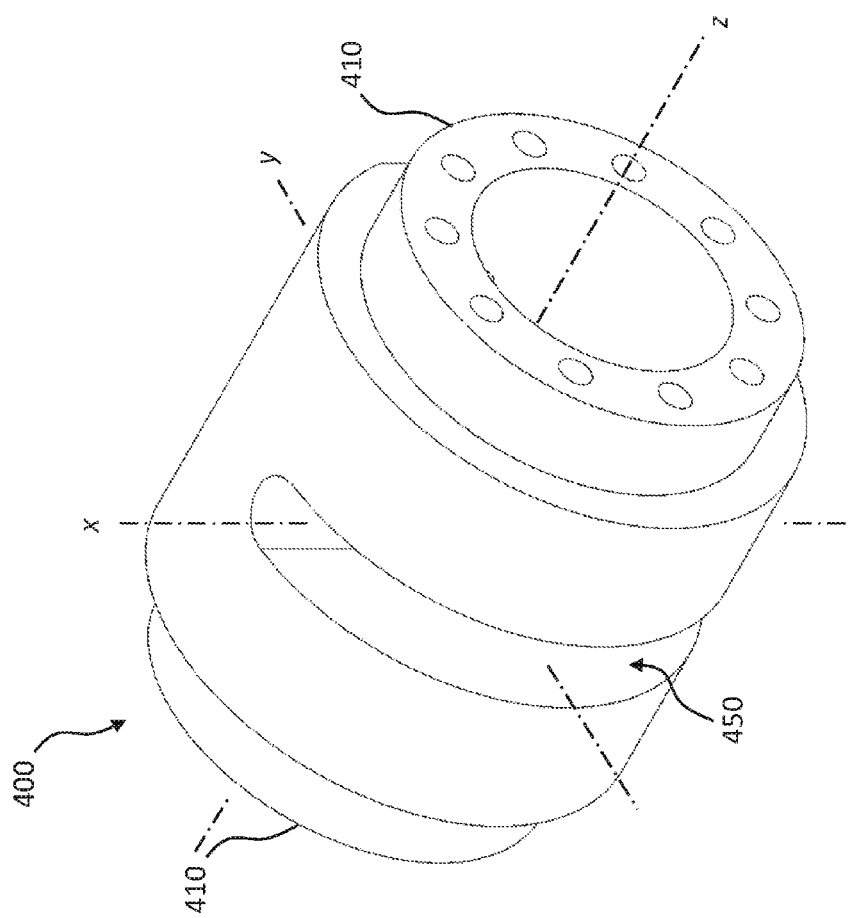
FIG. 9A depicts an isometric view of a first embodiment for the hub.

Another embodiment of the hub is depicted in FIGS. 9A to 12. FIG. 9 depicts an isometric view of a hub 400. The hub 400 comprises sides 410, top cable guide 420 (FIG. 10), and bottom cable slot 450. The diameter of sides 410 is dependent on the scale of the system and the bearings used between sides 410 and the inner ears 140 (FIG. 2). The diameter of sides 410 will be the same on both sides in most embodiments. Depending on the material and assembly methods for the robotic mechanism, one or both of sides 410 may be separate pieces from the hub 400 and fastened.

Figure 9B:
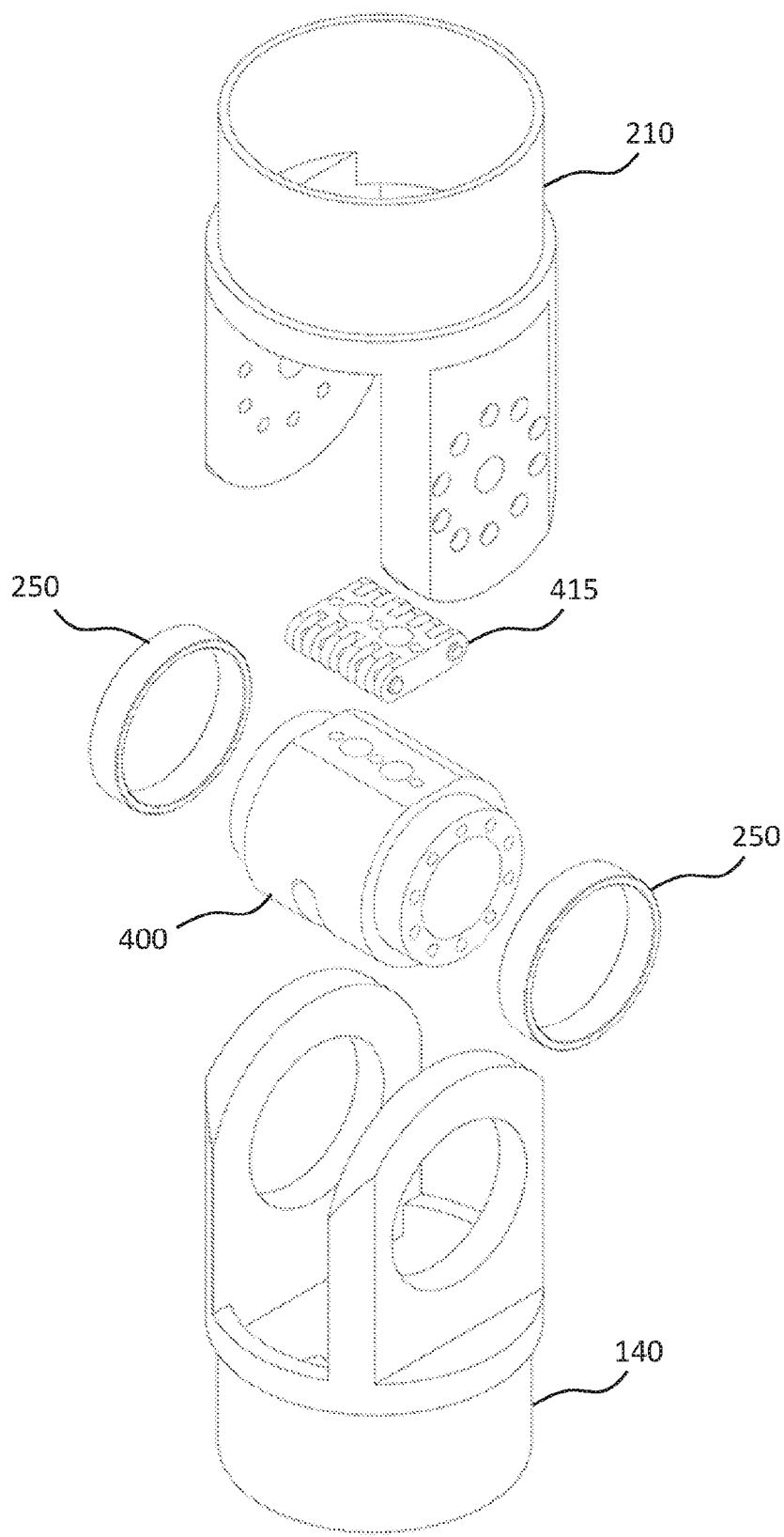
FIG. 9B depicts and exploded view of the mechanical joint with the hub embodiment of FIG. 9A.

FIG. 9B depicts an exploded view of the mechanical joint 100. The sides 410 of the hub 400 fit into the bearings 250 which fit into the internal ears 140. The external ears 210 fit over the internal ears 140 and are fastened to the hub 400. The link end 415 is fastened to the top of the hub 400. Chain 120 (FIGS. 1-3) is fastened to each side of the link end 415. A variety of types and sizes of fasteners and fastener methods may be used depending on the scale and intended application therefore fasteners and fastening methods have been omitted from the figures. Link ends 315 and 415 are example so link end 115 shown in FIGS. 1, 2, and 3A.

FIG. 10 depicts a top view of the hub 400 showing two larger diameter holes 420 through which cable 1000 is routed and three smaller diameter holes for attaching the link end 115 (FIG. 3) to the top of the hub 400. Smaller and larger modifiers with respect to holes indicate the size of the holes in relation to each other in the depicted embodiment. The actual sizes of the holes are dependent on the scale of the system, the fasteners, and the size of the cable bundles.

FIG. 11A depicts a view of the front of the hub 400. FIG. 11B depicts section view 11A-11A of FIG. 11A. The cables 1000 are routed down through the top cable guides 420 around through the bottom cable slot 450.

FIG. 12A depicts a view of the side of the hub. FIG. 12B depicts section view 12A-12A of FIG. 12A. FIGS. 8A and 8B show the cable routing down through the top cable guide 420 around through bottom cable slot 450 shown in FIGS. 11A and 11B. In the depicted embodiment of the hub 400 in FIGS. 9-12, the cables are routed side by side through the top cable guide 420, turn slightly in the center of the hub 400 and exit the bottom cable slot 450 vertically aligned, one above the other.

Depending on the scale, application, actuators, and number of cables 1000, a larger amount of cable 1000 may be looped into the central region 445 of the hub 400 to prevent the cable from bending beyond its bend radius and from stretching too tightly when the moving section 200 is at the outermost ranges.

Other Embodiments

Alternatively, the link end and the hub may be a single piece thus not requiring the fastener holes. In these embodiments multiple cables may route through separate holes or a single slot or passage wherein the slot or passage is typically centered in the top of the hub.

FIG. 13 depicts the hub embodiment of FIG. 5 combined with the link end 315 to form hub 300A. The depicted hub 300A uses a single slot or passage 320 in the top to route one or more cables down through.

Figure 14:
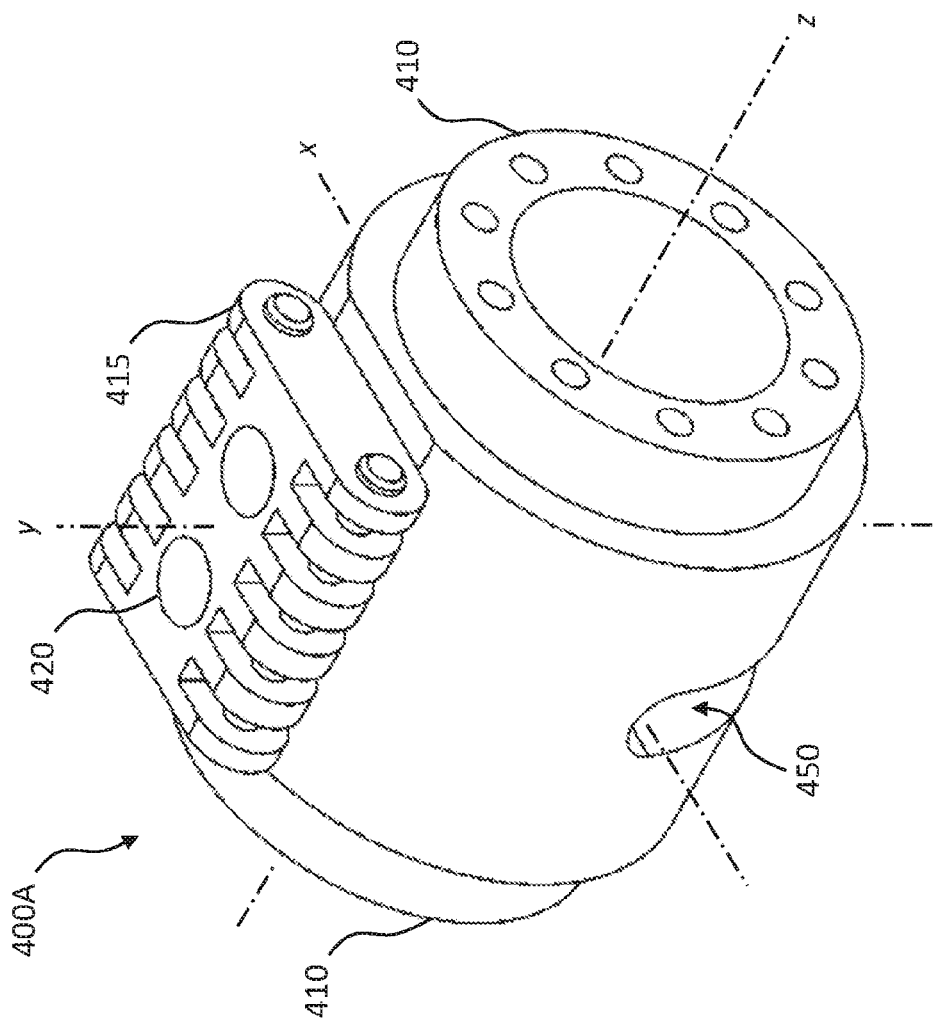
FIG. 14 is an isometric view of the hub embodiment of FIG. 9A with the link end attached.

FIG. 14 depicts the hub embodiment of FIG. 9 combined with the link end 415 to form hub 400A. The depicted hub 400A uses two separate holes or passages 420 through which two separate cable bundles are routed down through. Different embodiments may comprise a different amount of holes or passages depending on number of cables and cable types used.

Design Calculations

With respect to the configuration depicted in FIG. 2, wherein the hydraulic actuators 135 (also referred to as cylinders) are positioned parallel to the central axis of the actuating arm 150, combined with the hub 300 design described in embodiment 1, it is useful to consider a range of specific system dimensions to illustrate the practicality, flexibility and utility of the current invention. While the selection of chain 120 and hydraulic cylinder 135 sources, materials and design details, and consequently the tabulated values, may vary significantly depending on system requirements and design choices. Table 1, depicted and described below, serves to illustrate several aspects of the invention.

Consider an exemplary leaf chain product reference BL522, available through Jointway International Inc., wherein the chain pitch is ⅝ inches, plate height is 0.577 inches, plate thickness is 0.094 inches and when laced in a 2×2 configuration the tensile strength is claimed to be 9,000 pounds. In this chain application it is prudent to use a design factor in the range of 2 to 4. In this exemplary calculation a factor of 3 is used reducing the maximum chain operating capacity to 3,000 pounds. Therefore, 4×0.094 inches, or 0.376 inches of chain width will safely handle a 3,000-pound load, or alternatively, each inch of chain width will safely handle 3000/0.379 pounds, that is a 7,900-pound load.

Consider also an exemplary range of standard hydraulic cylinders such as the CDT (Cylinder Differential Tie Rod) series offered by the Bosch Rextroth Corporation. Table 1 below summarizes cylinder characteristics and units. Cylinder bore diameter (DC), piston rod diameter (DR), maximum operating pressure (MOP), and pounds of pull at a hydraulic pressure of 500 pounds per square inch (psi) (P500), are taken directly from the Rextroth hydraulic cylinder catalog referenced above. Maximum pounds pull (PM), at the maximum operating pressure (MOP) is calculated by dividing P500 by 500 and multiplying by the maximum operating pressure (MOP). Chain width (W), is calculated by dividing the pounds pull at the maximum operating pressure (PM) by the previously calculated 7,900 pound load capacity per inch of chain width (W), and then adjusting up to the next higher width corresponding to an even number of chain plates.

TABLE 1

| DC (in) | DR (in) | MOP (psi) | P500 (lbf) | PM (lbf) | W (in) | PCD1 (in) | DH1 (in) | HID (in) | HOD (in) | MBR (in) | DH2 (in) | PCD (in) | T (lb-ft) |
|---|---|---|---|---|---|---|---|---|---|---|---|---|---|
| 1 | 0.5 | 1500 | 294 | 882 | 0.38 | 1.5 | 0.875 | .25 | .55 | 2 | 3.45 | 4.03 | 148 |
| 1.5 | 1 | 1500 | 493 | 1479 | 0.38 | 2 | 1.375 | .375 | .68 | 2.5 | 4.32 | 4.9 | 302 |
| 2 | 1 | 1500 | 1178 | 3534 | 0.56 | 2.5 | 1.875 | .375 | .68 | 2.5 | 4.32 | 4.9 | 721 |
| 2.5 | 1 | 1500 | 2063 | 6189 | 1.13 | 3 | 2.375 | .375 | .68 | 2.5 | 4.32 | 4.9 | 1263 |
| 3.25 | 1 | 1500 | 3758 | 11274 | 1.50 | 3.75 | 3.125 | .5 | .79 | 3.5 | 6.21 | 6.79 | 3188 |
| 4 | 1.37 | 1000 | 5540 | 11080 | 1.50 | 4.5 | 3.875 | .5 | .79. | 3.5 | 6.21 | 6.79 | 3133 |
| 5 | 1.75 | 750 | 8615 | 12923 | 1.69 | 5.5 | 4.875 | .5 | .79 | 3.5 | 6.21 | 6.79 | 3654 |
| 6 | 1.75 | 750 | 12930 | 19395 | 2.63 | 6.5 | 5.875 | .75 | 1.08 | 4.75 | 8.42 | 9.0 | 7271 |
| 8 | 2 | 500 | 23565 | 23565 | 3.01 | 8.5 | 7.875 | .75 | 1.08 | 4.75 | 8.42 | 9.0 | 8834 |

The minimum pitch circle diameter (PCD1) takes account of the cylinder wall thickness and end plate design and is the distance between the centerlines of the piston rods of the two cylinders 135 when the two parallel cylinders 135 are in contact with each other. The minimum hub 300 diameter (DH1) is the diameter of the cylindrical surface on which the chain 120 rolls and is calculated by subtracting the chain link (also referred to as a plate) height from the minimum pitch circle diameter. The hub design of embodiment 1 may ensure throughout the full range of motion of the joint, the hydraulic hoses and other hoses, cables and conduits passing through the joint are not forced to bend at a radius less than the hose, cable or conduit manufacturers' specified minimum bend radius (MBR).

With regard to the hydraulic hoses, the hydraulic cylinder ports are generally sized by the cylinder manufacturer to allow connection to appropriately sized hoses which are typically defined by the hose inside diameter (HID). Hydraulic hose manufacturers, given the hose internal diameter (HID) and the operating conditions for the particular hose application, typically recommend a particular hose construction and specification including a hose outside diameter (HOD) and minimum bend radius (MBR). To achieve the desired minimum bend radius requirement, the diameter of the hub of the type disclosed in embodiment 1 of this specification (DH2) is calculated as twice the minimum bend radius (MBR) minus the hose outside diameter (HOD). The pitch circle diameter of the chain (PCD2) is obtained by the addition of the chain plate height to the hub diameter (DH2). Half this dimension (i.e. the radius) is multiplied by the maximum pounds pull (PM) and divided by 12 to obtain the maximum torque (T).

Table 2 below includes the same range of hydraulic cylinders as Table 1 and includes the pitch circle diameter of the chain (PCD2) derived in Table 1. The piston stroke (S) is the distance each of the pistons in the hydraulic cylinders 135 must travel to achieve 180° of rotation of the hub 300 and is calculated by multiplying half the chain pitch circle diameter (PCD2) by $\pi$ (pi). To obtain the length of the hydraulic cylinder assemblies 135, a fixed cylinder component dimension (FCL) which accounts for piston length, end cap thicknesses, hydraulic port locations, mounting clevis dimensions, and any other components which affect the length of the assemblies is obtained from the cylinder manufacturer. In this example they are taken directly from the Rextroth hydraulic cylinder catalog referenced above. The length (L) of the cylinder/chain/hub sub-assembly, from the centerline of the cylinder mounting clevis pin to the centerline of hub 300, is calculated by summing the calculated piston stroke (S), the fixed cylinder component dimension (FCL), half the chain pitch circle diameter (PCD2), and an allowance for the dimension of the couplings between the chains and the piston rods.

TABLE 2

| DC | DR (in) | PCD2 (in) | S (in) | FCL (in) | L (in) |
|---|---|---|---|---|---|
| 1 | 0.5 | 4.03 | 6.33 | 5.00 | 17 |
| 1.5 | 1 | 4.9 | 7.70 | 5.75 | 20 |
| 2 | 1 | 4.9 | 7.70 | 5.75 | 20 |
| 2.5 | 1 | 4.9 | 7.70 | 5.88 | 21 |
| 3.25 | 1 | 6.79 | 10.67 | 6.88 | 25 |
| 4 | 1.375 | 6.79 | 10.67 | 7.13 | 26 |
| 5 | 1.75 | 6.79 | 10.67 | 7.63 | 28 |
| 6 | 1.75 | 9 | 14.14 | 8.38 | 33 |
| 8 | 2 | 9 | 14.14 | 8.63 | 34 |

The calculations described above for the leaf chain, hydraulic cylinders 135, and other related components selected for this discussion are sufficiently generic to provide a valid generalization. The analysis demonstrates the scalability of the disclosed chain driven articulated joint, the same methodology and resulting scaled outcome may apply regardless of hydraulic cylinder diameter. In general, rather than the hydraulic cylinder diameter, it is the minimum bend radius of the hydraulic hose that may determine the hub diameter which in turn may determine the available torque, the arm housing depth, and the piston stroke and therefore the hydraulic cylinder length and minimum arm length. It should be noted that other cables, cable bundles, hoses or conduits may pass through the articulated joint, in which case the greatest minimum bend radius may determine the hub diameter and related dimensions. It should also be noted that the chain width may be less than the hydraulic cylinder diameter allowing an asymmetric arm housing wherein the housing width is less than its depth.

Additionally, the calculations described above may be applied to hub embodiment 2 400.

Control

In the following figures simple schematics are overlaid on the actuating arm 150. The schematics are not intended to portray actual cable routing through the actuating arm 150, rather they are intended to portray the cabling necessary for actuator control for a number of embodiments.

Hydraulic Control

For embodiments having hydraulic actuators, the hydraulic fluid must flow to the actuator and/or motors, then return to a reservoir. The fluid is then filtered and re-pumped. The path taken by hydraulic fluid is called a hydraulic circuit of which there are several types including open center and closed center. Hydraulic circuitry is known in the art and is therefore not shown or described in detail. Simple open center and closed center circuits are shown and described in the following embodiments.

Figure 15:
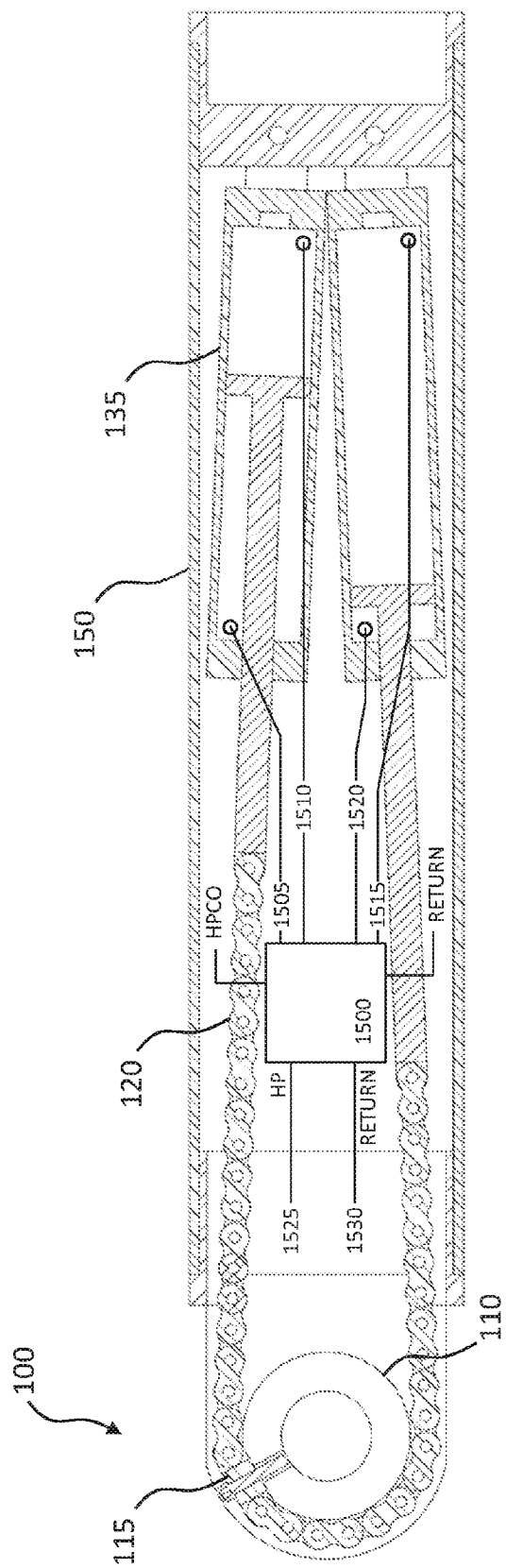
FIG. 15 depicts an embodiment comprising open center hydraulic actuators.
Figure 16:
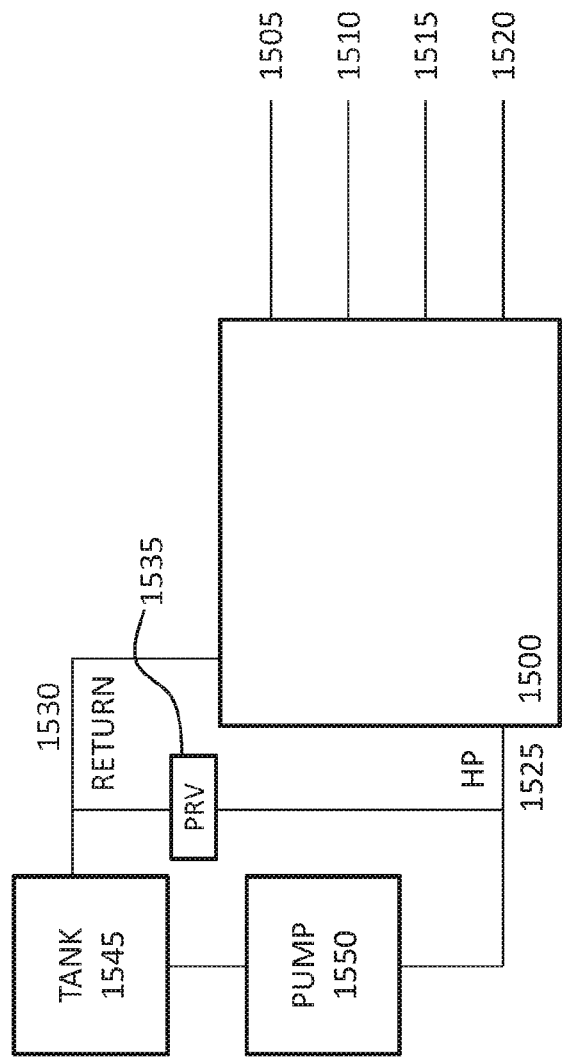
FIG. 16 depicts an open center hydraulic schematic for the embodiment of FIG. 15.

FIGS. 15 and 16 depict an embodiment comprising hydraulic actuators 135 with open center hydraulic control. In embodiments having more than one joint, high pressure 1525 and return lines 1530 run through each joint to each valve. The joint closest to the base of the robotic mechanism will have an additional high pressure and return line, not shown, which run to a hydraulic fluid tank which provides hydraulic fluid to the entire robotic mechanism. In embodiments having a single joint, the high pressure 1525 and return lines 1530 connect to a tank 1545 and a pump 1550 as shown in FIG. 16.

The open center circuit uses a pump or pumps 1550 which supply a continuous flow of hydraulic fluid to the control valve 1500. The flow is returned to a tank 1545 through the control valve's 1500 open center; that is, when the control valve 1500 is centered, it provides an open return path 1530 to tank 1545 and the fluid is not pumped to a high pressure. Otherwise, if the control valve 1500 is actuated it routes fluid to and from an actuator 135 and tank 1545. The fluid's pressure will rise to meet any resistance, since the pump 1550 has a constant output. If the pressure rises too high, fluid returns to tank 1545 through a pressure relief valve 1535. Multiple control valves 1500 may be stacked in series. This type of circuit can use inexpensive, constant displacement pumps 1550. Open center hydraulic control is a simple and viable system for robotic arms having few joints.

When lowering the moving arm 200, hydraulic fluid flows into the cylinders 135 through lines 1510 and 1520 and hydraulic fluid flows out of the cylinders through lines 1505 and 1515. To raise the arm fluid flow is reversed.

Figure 17:
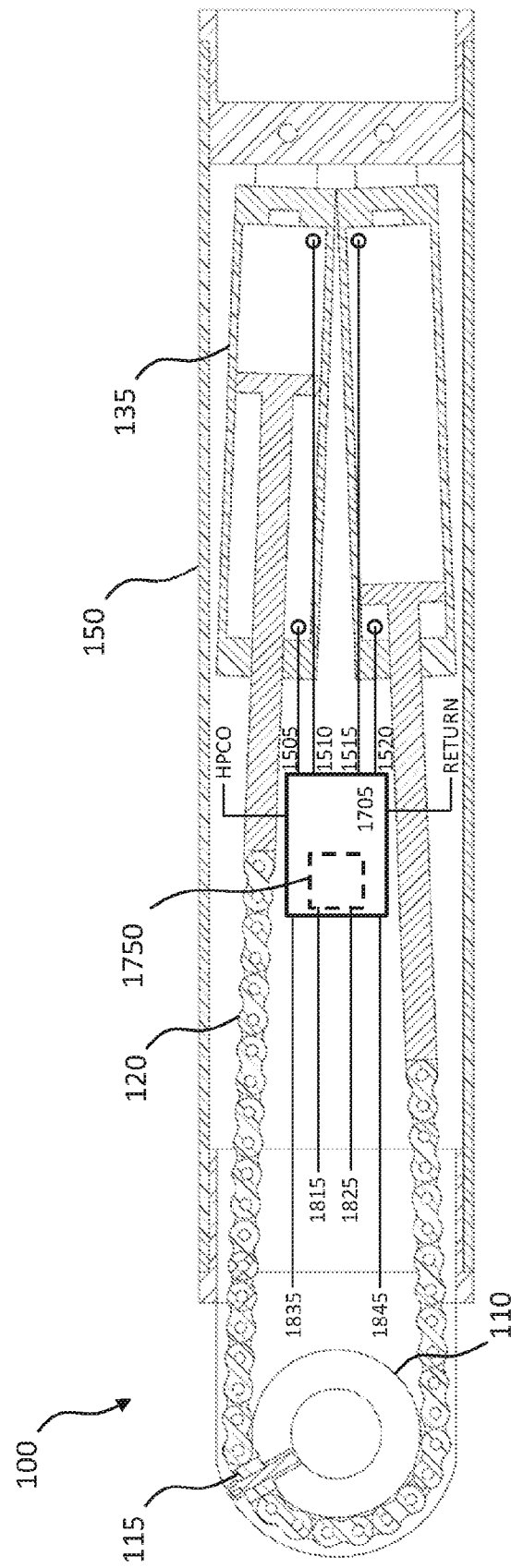
FIG. 17 depicts an embodiment comprising closed center hydraulic actuators.

FIG. 17 depicts an embodiment comprising hydraulic actuators 135 with electrical over hydraulic closed center control. Pump(s), tank, and cable connections to a robotic mechanism control system are omitted from the figures for clarity. For robotic mechanisms with electric control, the joint closest to the base of the robotic mechanism will have an additional power line, not shown, which runs back to the robotic mechanism control system. The robotic mechanism control system is the primary control point for the robotic arm. Referring to FIG. 17, the closed center circuit supplies full pressure to the control valves 1705, whether any valves 1705 are actuated or not. The pumps vary their flow rate, pumping very little hydraulic fluid until the operator actuates a valve 1705. The valve's 1705 spool therefore doesn't need an open center return path to the tank. Hydraulic fluid travels to and from the cylinders 135 through lines 1505, 1510, 1515, and 1520. A high pressure relief valve (not shown) allows for hydraulic fluid to flow out of the system when the pressure limit is exceeded. Unused fluid travels back to the tank (not shown) from a return line. Only four cables need to be routed through the joint: the high pressure carry over 1835, the return 1845, power 1815, and ground 1825. The hydraulic actuators 135 and valves 1705 in FIG. 17 are controlled by electronic control system 1750. The electronic control system 1750 may be collocated with the valve 1705, on or within the actuating arm 150, or remote to the robotic mechanism.

Figure 18:
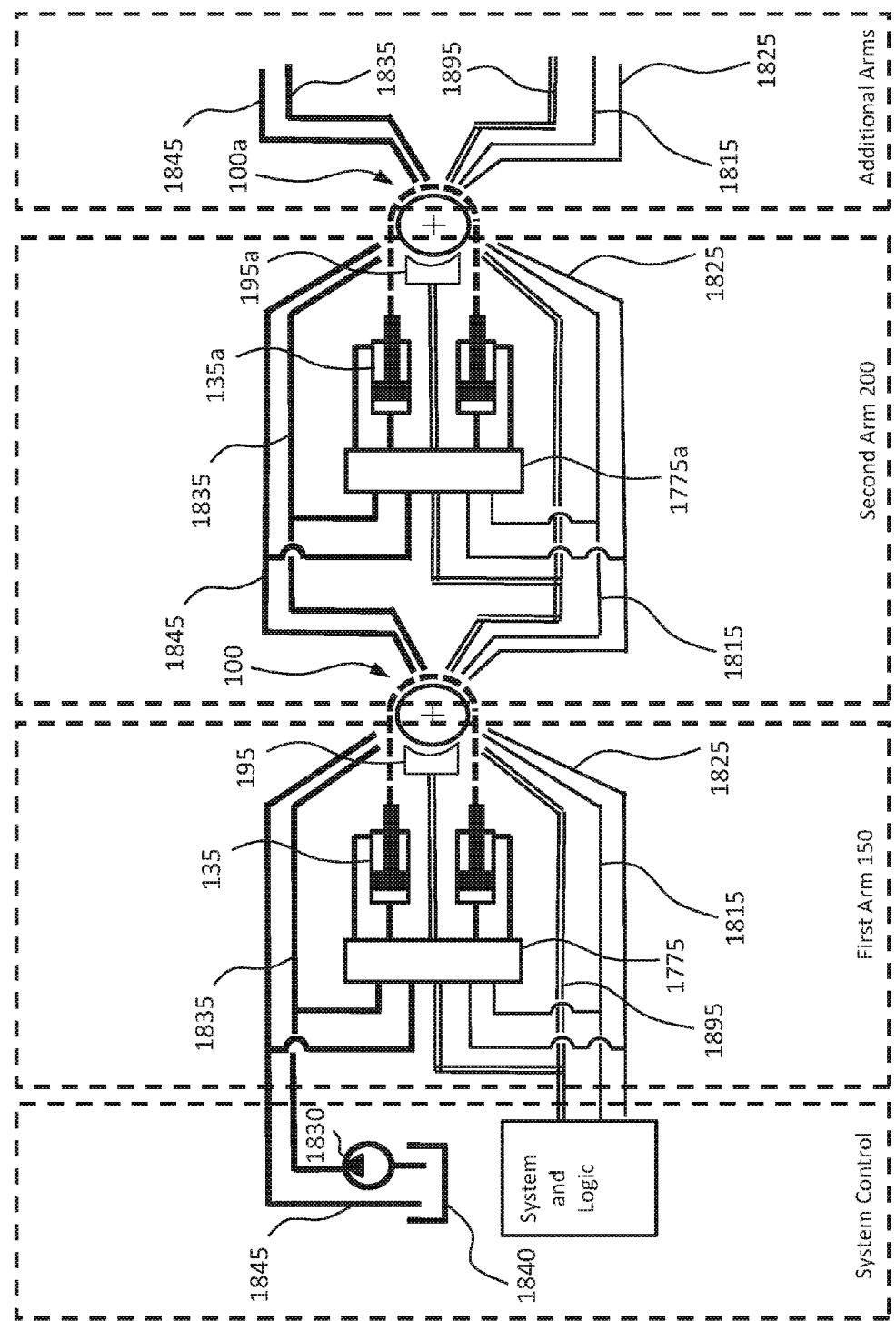
FIG. 18 depicts the embodiment of FIG. 17 for multiple joints.

A robotic mechanism may comprise multiple arms, as depicted in FIG. 18. A first arm 150 may be attached to a platform (not shown) that may be stationary, such as a floor or ground mounted pedestal, or moveable, such as a truck bed. The first arm 150 may comprise two hydraulic cylinders 135, two lengths of leaf chain or equivalent and a rotating hub to provide a rotating joint 100, as previously described. A second arm 200, may be attached to the rotating hub of the first arm 150. The second arm 200 may also comprise two hydraulic cylinders 135a, two lengths of leaf chain or equivalent and a rotating hub to provide a rotating joint 100a. Additional arms may be added in the same fashion in order to achieve a desired degree of articulation. While the hub described in embodiment 1, above, provides a wide path for hoses, cables or conduits to pass through the rotating joint, without violating minimum bend radius requirements, it is still desirable to minimize the number of hoses, cables or conduits that must run through the system. FIG. 18 shows a single hydraulic high pressure line 1835 which runs from the hydraulic pump 1830 through the first arm 150, through the hub that links the first arm 150 and the second arm 200, through the second arm 200, through the hub that links the second arm 200 to the next arm, and so on through the additional arms until it reaches the last arm in the system. A hydraulic return line 1845 follows a path parallel to that of the high pressure line back from the last arm to the hydraulic fluid tank 1840. Two electrical power lines 1815, 1825 are shown originating at the system logic and control module 4000 and entering the first arm 150 to follow a path parallel to that of the high pressure hydraulic line 1835 from the first arm 150 to the last arm in the system. Depending on voltage and power requirements a single multicore cable may be used. A signal cable 1895, such as a twisted pair to support a CAN network or a multi-core cable to support other messaging protocols, follows the same path from the system logic and control module to the last arm in the system. Each arm in the robotic system contains a local control module 1775 comprising one or more solenoid actuated hydraulic control valves, an electronic control module and a connection to one or more linear or rotary position sensors, 195. Also within each arm, the high pressure hydraulic line 1835 and hydraulic return line 1845 are tapped and connected to the one or more hydraulic control valves in local control module 1775, the one or more electrical power cables are tapped and connected to the electronic control module in local control module 1775, and the signal line 1895 is tapped and connected to the electronic control module in local control module 1775. Thus, regardless of how many joints are present in the arm, the same number of cables will be routed through each joint.

FIG. 18 shows the actuating arm 150 of FIG. 17 being used in parallel with additional attached arms. FIG. 18 further comprises sensors 195, 195a located on, or in proximity to, each joint 100, 100a, respectively. Each sensor 195 and 195a sends signals back to a robotic mechanism control system and logic 4000 responsible for controlling the motion of the robotic mechanism. The signals from sensors 195 and 195a pass through each joint 100, 100a to one or more signal busses (e.g. CAN bus) to the robotic mechanism control system 4000. The signal busses, not shown, reduce the number of cables passing through each joint 100, 100a. In one example, only one sensor line 1895 passes through each joint 100, 100a even if one or more sensors 195, 195a are located on every joint 100, 100a in the robotic mechanism.

Figure 19:
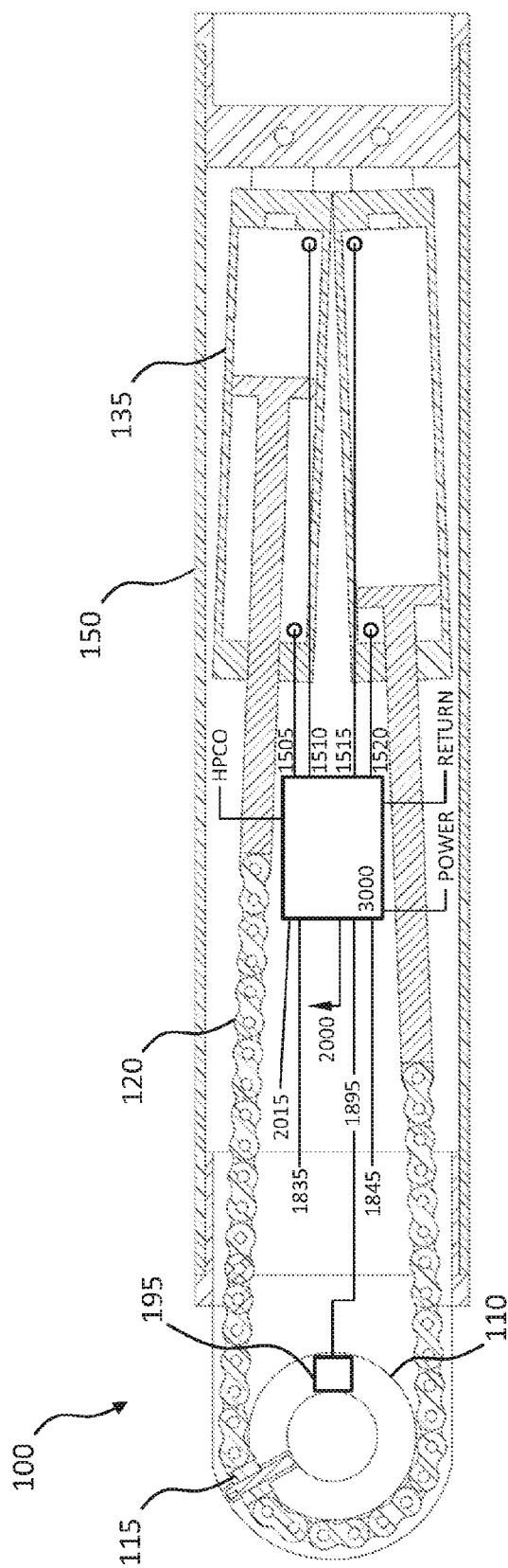
FIG. 19 depicts the embodiment of FIG. 17 comprising Bluetooth communications.
Figure 20:
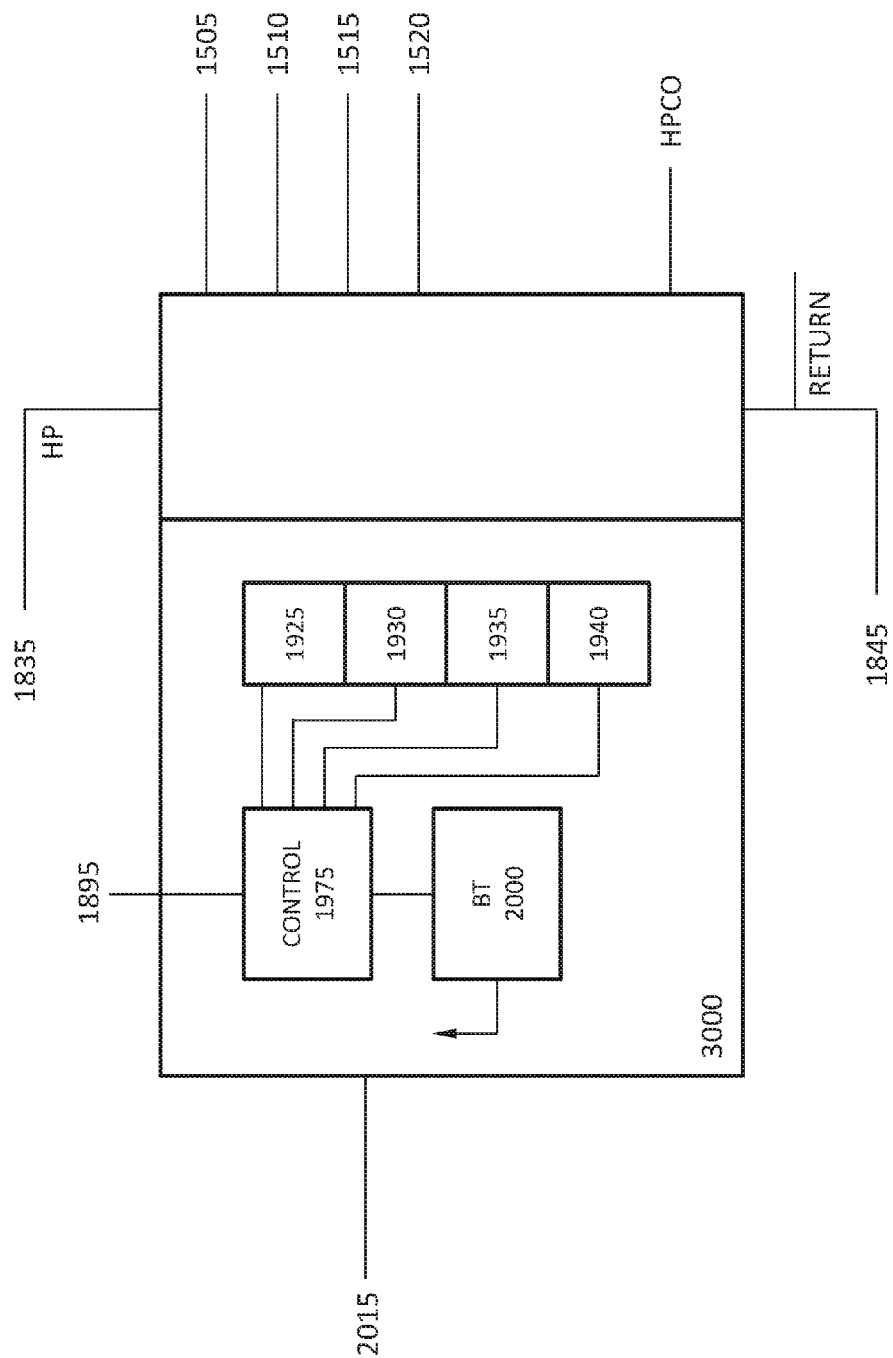
FIG. 20 depicts an electrical over hydraulic schematic for the embodiment of FIG. 19.

FIGS. 19 and 20 depict the embodiment of FIG. 17 with Bluetooth communications. This embodiment functions similarly to embodiment of FIG. 17. The control system 3000 comprises controller 1975, Bluetooth communications 2000, and high pressure oil control solenoids 1925, 1930, 1935, and 1940. In this embodiment, communications are transferred wirelessly via Bluetooth 2000. For this embodiment, only the high pressure carry over 1835, the hydraulic return line 1845, and a power cable 2015 need to be transferred through each joint. In some embodiments a sensor 195 such as a rotary encoder may be used to determine angle and position of the joint 100. The data from the sensor 195 will be sent to the robotic mechanism control system via line 1895. In some embodiments, the data may be sent wirelessly via Bluetooth. In some embodiments, power may also be transmitted wirelessly.

Linear Actuator Control

Figure 21:
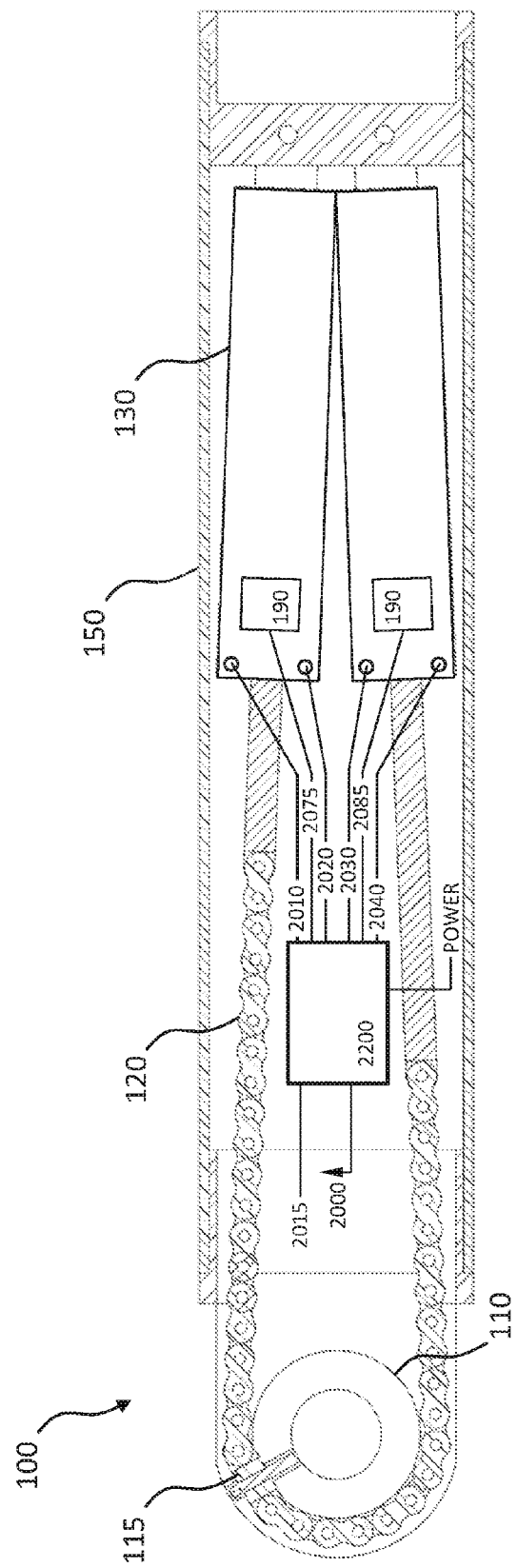
FIG. 21 depicts an embodiment comprising linear actuators.
Figure 22:
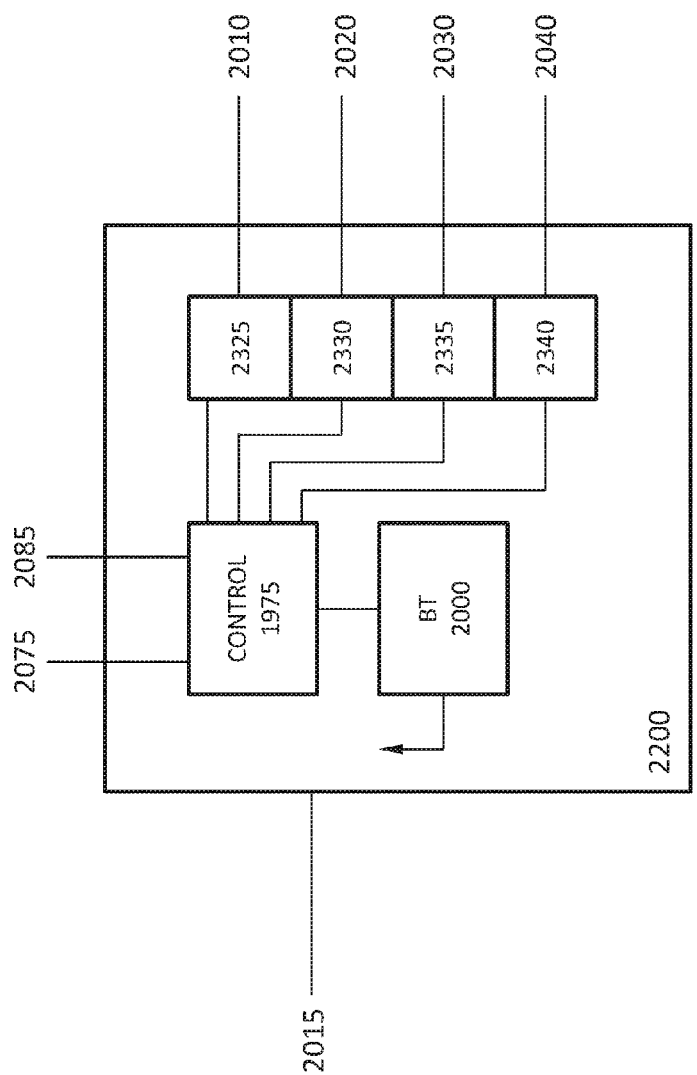
FIG. 22 depicts a control schematic for the linear actuators of FIG. 21.

FIGS. 21 and 22 depict electrical controller 2200 with linear actuators 130. In one example, electrical controller 2200 may be a processor, logic circuitry, or any other type of programmable logic device. The linear actuators 130 may be of any type, such as previously noted in the "Actuators" section above. In some embodiments, a position sensor 190 may be connected to one or both of the linear actuators 130. Positive and negative leads 2010, 2020, 2030, and 2040 connect the linear actuators 130 to solenoids 2325, 2330, 2335, and 2340 in the control system 2200. The controller 1975 receives information from the position sensors 190 through wires 2075 and 2085. In this embodiment, communications are transferred wirelessly via Bluetooth transceiver 2000 to the robotic mechanism control system thus this embodiment requires only power 2015 to pass through any of the joints in the system. The addition of one or more sensors may require one or more additional wires to pass through each joint. One or more busses (e.g. CAN bus) may be used to reduce the number of wires required to pass through each arm. In some embodiments, power and or sensor signals may be transmitted wirelessly.

Figure 23:
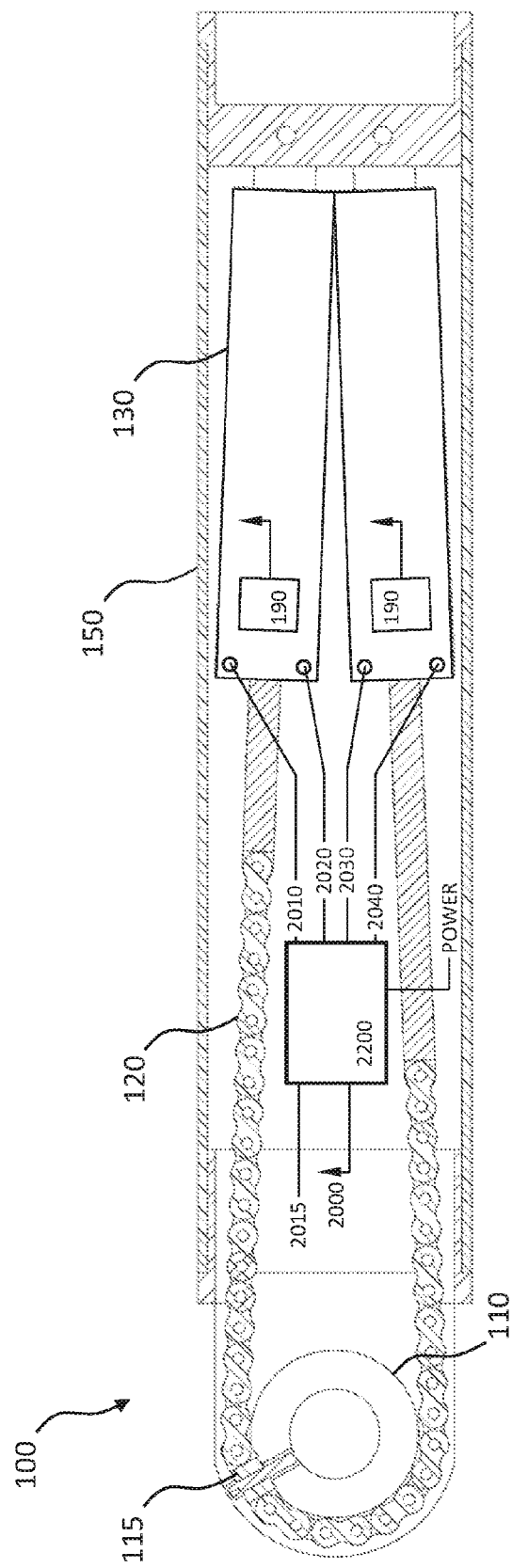
FIG. 23 depicts an alternate embodiment of FIGS. 21 and 22 wherein the sensors are wireless.

FIG. 23 depicts an alternate embodiment of FIGS. 21 and 22 wherein the position sensors 190 transmit data wirelessly using Bluetooth transceivers or near field communication (NFC) rather than via wires, thus reducing total system cabling. The Bluetooth transceiver(s) may be located anywhere on or within the actuating arm 150 such as on or in at least one of the actuators 130 on the outside of the actuating arm 150, and on the hub 110.

Processor

One or more embodiments may comprise a processor for controlling the motion of the robotic arms as well as for gathering and analyzing sensor data. The processor may be located on or near at least one of the linear actuators 130, within the actuating arm 150, remote to the system, or in the robotic mechanism control system. The processor may be configured to receive sensor data from linear actuator sensors 190, determine the first position of the moving arm 200 with respect to the actuating arm 150, generate a moving arm control signal to actuate the linear actuators connected to the flexible mechanical drive system to rotate the hub resulting in the change of position between the actuating arm and the moving arm from the first position to the second position, and receive sensor data from the linear actuator sensors to verify the moving arm is in the second position. Data transfer between the processor and other system components may be one of wired or wireless.

In some embodiments the processor may have a memory. Further, other embodiments may store knowledge of one or more 3D working spaces obtained from sensor readings, 3D imaging, cameras, theoretical models, etc. The system may use that knowledge to intelligently control the robotic mechanism within the 3D workspace, including around obstacles. For instance, rather than an operator having to input individual commands to each joint for complex motions, an operator could input a simple command to, for example, pick up the object behind the wall, and the robotic mechanism will know how to actuate each of its joints to perform the action without coming in contact with obstacles.

Sensors

One or more sensors may be incorporated at one or more locations in the robotic mechanism including on or about the one or more linear actuators, the hub, and within the actuating arm 150. The purpose of the one or more sensors may be at least one of monitoring the robotic mechanism and monitoring the environment. Sensors may be at least one of contact and non-contact. Sensors that monitor the robotic mechanism may be used to determine and/or track the precise location of the end effector, linear actuator actuation distance, linear actuator position, speed of motion, acceleration, and torque, among other things. Sensors that monitor the environment may be used to determine radiation levels, air quality, temperature, and heat signatures, among other things. Sensors may be one or more of inductive and capacitive. Sensors may be wired or wireless. Additionally, one or more lights and/or cameras may be included. Lights and/or cameras may aid in the remote control of the robotic mechanism by allowing the operator to view a location that is otherwise inaccessible.

The robotic arm system may include a feedback module in order to prevent damage or failure of the robotic arm. Some embodiments of the robotic arm system may include one or more of force sensors, pressure sensors, position sensors, torque sensors, voltage sensors, current sensors, and other various sensors linked to the control system. The feedback module may allow implementation of arm protection algorithms that utilize sensor data to determine the current orientation of the robotic arm system and determine the anticipated electrical and or mechanical loads on each joint. Sensor errors may be taken into account and maximum allowable loads that can be calculated. If the sensor readings exceed the maximum allowable, the robotic arm system may be disabled to prevent it from being damaged, stressed, or failing.

When multiple sensors are used, the data from the sensors may be combined in a sensor fusion process. Sensor fusion may use a Kalman filter similar to those used for guidance, navigation, and controlling objects and time series analysis in signal processing, robotic motion planning and control, and trajectory optimization. The algorithm works in a two-step process. In the prediction step, the Kalman filter produces estimates of the current state variables, along with their uncertainties. Once the outcome of the next measurement, including the application of some amount of error including random noise, is observed, these estimates are updated using a weighted average, with more weight being given to estimates with higher certainty. The algorithm is recursive. It can run in real time, using only the present input measurements and the previously calculated state and its uncertainty matrix; no additional past information is required.

Sensor Characterization

Figure 24:
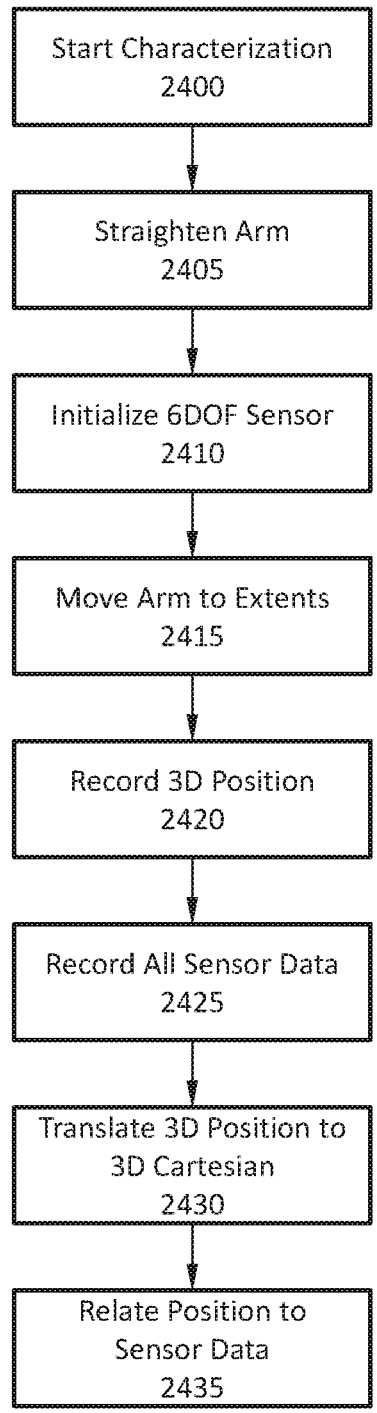
FIG. 24 is a process diagram depicting the sensor characterization process.

FIG. 24 is a process diagram depicting a sensor characterization process. Typically, at least once prior to utilization of a robotic arm comprising one or more joints the sensors may be characterized. This process is helpful in calibrating the sensors and determining the full extents of the robotic system. Typically a six degree of freedom (6DOF) sensor will be placed at the end effector on the robotic arm. The origin may be set at any location on the robotic arm but is typically located at the end effector.

The sensor characterization process begins at operation 2400. Next, the arm is fully extended where the central axis of every arm is collinear in operation 2405. The 6DOF sensor is initialized in operation 2410. Next, the arm is moved through a series of motions describing the full extent of its reach in operation 2415. Throughout the movement the 3D position is recorded in operation 2420 along with all of the sensor data in operation 2425. The 3D position data is then translated to 3D uniform Cartesian coordinates in operation 2430. The position data is then related to the sensor data in operation 2435.

Control Processes

In the following processes, the term "arm" refers to any robotic arm having one or more joints. The processes may be directed and initiated by an operator and/or performed automatically by the control system. The control system may comprise one or more processors located at least one of within the robotic mechanism, on the robotic mechanism, and remote to the robotic mechanism.

Figure 25:
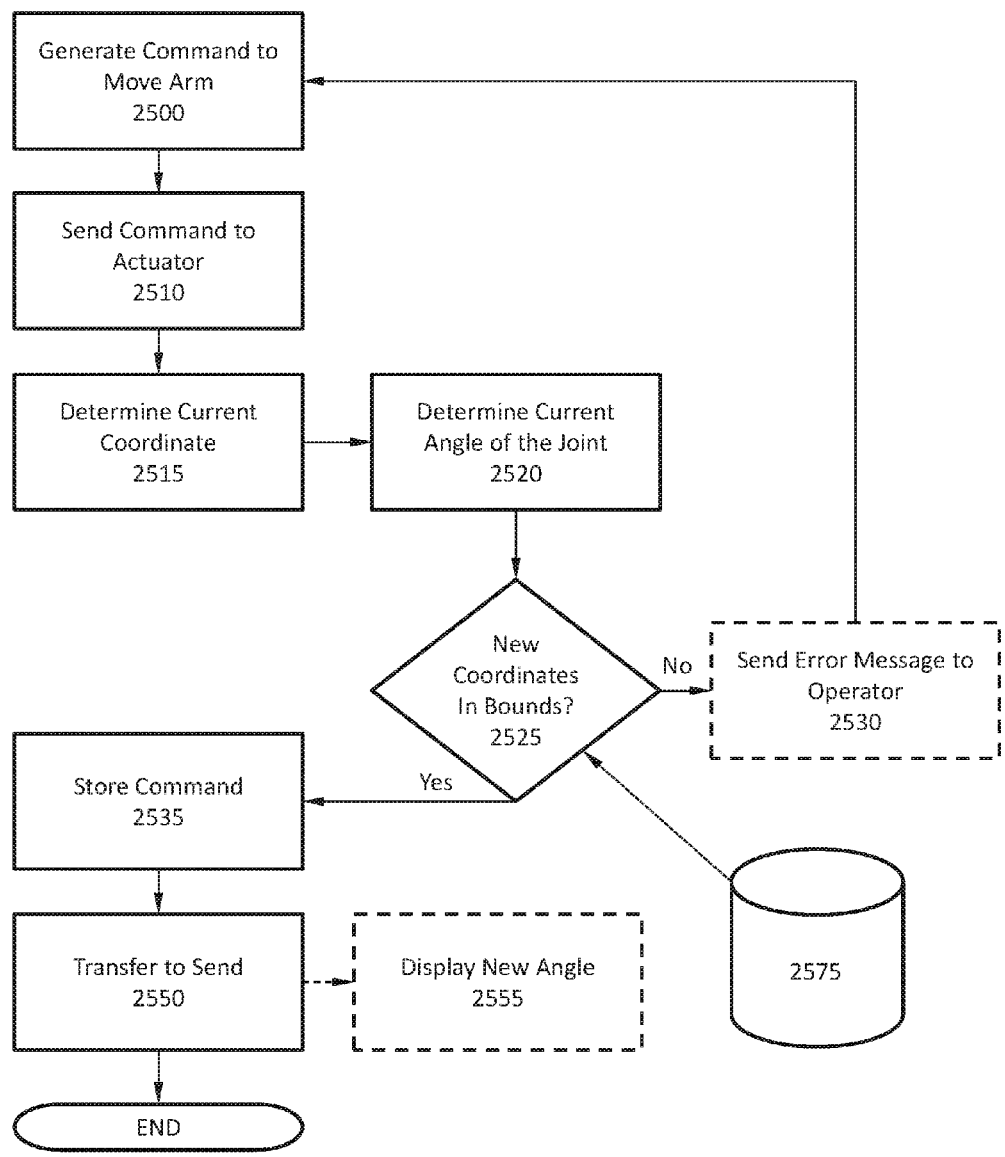
FIG. 25 depicts a process embodiment for preventing a robotic arm from attempting to move outside of its movement envelope.

FIG. 25 depicts a first process embodiment for preventing a robotic arm from attempting to move outside of its movement envelope. First, an operator generates a command to move the arm in operation 2500 and the command is sent to the actuator(s) 2510. Next, the processor will determine the current coordinate of the working end of the arm (or end effector, in some embodiments) 2515 and the current angle of the joint 2520. Coordinate bounds for the robotic system are stored in database 2575. If new coordinates are not in bounds 2525 the operator may generate a new command 2500. In some embodiments, an error message may be displayed to the operator 2530. If the coordinates are in bounds 2525 the command will be stored 2535. The command will then be transferred to send 2550. In embodiments having a display, the new angle will be displayed 2555. The movement is then complete and the system awaits a new command.

Figure 26:
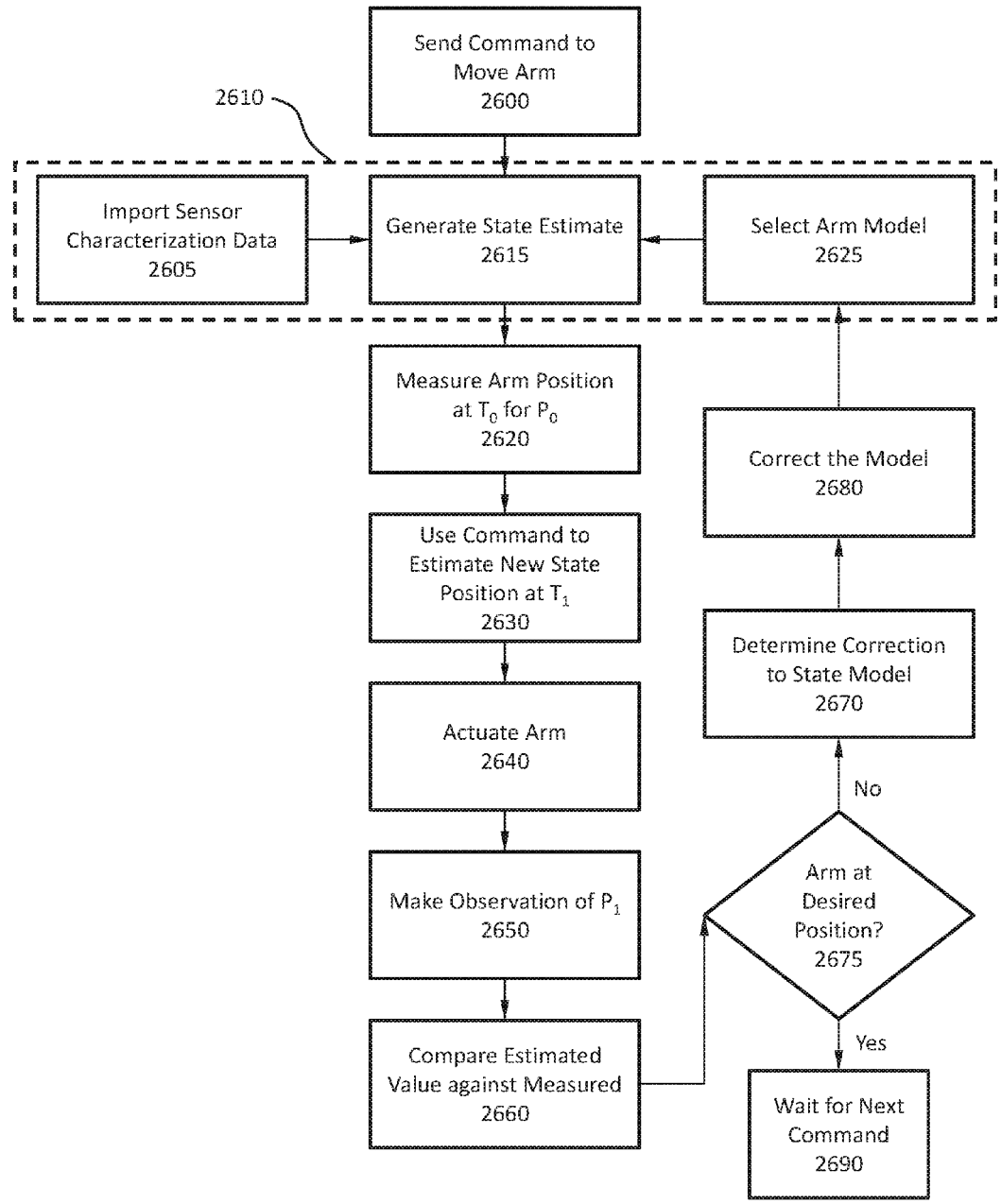
FIG. 26 depicts a process embodiment for controlling the robotic arm.

FIG. 26 details a process embodiment for keeping the arm movement within its movement envelope. First, an operator sends a command to move the arm 2600. A state estimator 2610 is used to obtain sensor data 2605 and select arm model 2625 to generate a state estimate 2615. The arm initial position, $P_0$, is then measured at time $T_0$ 2620 to provide a basis for comparison. The operator command input is then used to estimate a new state position at position $P_1$ and time $T_1$ 2630 and the arm is actuated to the new state position 2640. The new position $P_1$ is observed 2650 and compared to the estimated value 2660. If the arm is at the desired position 2675, the system will await the next command 2690. If the system is not at the desired position, a correction to the state model is determined 2670 based on the comparison and the model will be corrected 2680 and input into the state estimator 2610 and will repeat the process to move the arm into position.

Other Design Aspects

Prospective Materials

The materials used in the manufacture of the robotic mechanism are dependent on the particular application for which the robotic mechanism is designed.

In an embodiment, the robotic apparatus may be designed to enter highly radioactive areas. In this embodiment, the frame of the robotic apparatus may be manufactured out of a radiation tolerant material such as carbon fiber. The use of carbon fiber for the frame has additional advantages such as reduced weight and material costs and, as such, may be used in applications other than radiation tolerant embodiments.

In some embodiments the robotic mechanism may be sealed so as to be watertight for applications in which the robotic arm is required to operate while partially or wholly submerged. In such an embodiment the average depth to which the robotic mechanism may be submerged and the liquid it is submerged in will need to be taken into consideration. If the robotic apparatus is to be submerged at greater than one atmosphere of pressure, pressure vessel calculations will need to be used in order to determine the appropriate material for manufacture. In one embodiment, the body of the robotic mechanism is constructed from hollow aluminum tools to increase buoyancy.

EXAMPLES

Some non-limiting examples are provided below.

Example 1 may include a mechanical joint mounted between an actuating arm and a moving arm, comprising: a hub having one or more cable routing passages configured to allow cable passage through the hub from the actuating arm to the moving arm; at least two linear actuators connected to a flexible mechanical drive system wherein the flexible mechanical drive system is configured to rotate the hub about its central axis resulting in a change of position between the actuating arm and the moving arm from a first position to a second position; linear actuator sensors located at least one of on or proximate to the linear actuators configured to determine positions of the linear actuators.

Example 2 may include the system of example 1, further comprising a processor configured to: receive sensor data from the linear actuator sensors, determine the first position of the moving arm with respect to the actuating arm, generate a moving arm control signal to actuate the linear actuators connected to the flexible mechanical drive system to rotate the hub resulting in the change of position between the actuating arm and the moving arm from the first position to the second position, receive sensor data from the linear actuator sensors to verify the moving arm is in the second position.

Example 3 may include example 2, wherein the processor is located at least one of within the actuating arm, proximate to the actuating arm, and remote to the actuating arm.

Example 4 may include example 1, wherein the hub profile dimensions are less than the largest dimensional profile measurement of the moving arm.

Example 5 may include example 1, wherein the linear actuator sensors are located at least one of on and proximate to the hub.

Example 6 may include example 5, wherein the linear actuator sensors comprise a rotary encoder.

Example 7 may include example 1, wherein one or more cables are passed through the hub.

Example 8 may include example 1, wherein the cable is at least one of power, hydraulic, pneumatic, and communications.

Example 9 may include example 1, wherein the at least two linear actuators are at least one of hydraulic, electric over hydraulic, pneumatic, mechanical, electro-mechanical, piezoelectric, electric, and linear motor actuators.

Example 10 may include example 1, wherein one or more linear actuator sensors comprise one or more of distance and position.

Example 11 may include example 1, wherein the flexible mechanical drive system comprises at least one of cogs, links, chains, and belts.

Example 12 may include example 11, wherein the cogs are at least one of machined and cast.

Example 13 may include example 11, wherein the chain may be leaf, link, or roller.

Example 14 may include example 1, wherein the moving arm has a range of motion of 180° perpendicular to a central axis of the actuating arm.

Example 15 may include example 1, wherein data transfer is wired or wireless.

Example 16 may include a method for operation and control of a mechanical joint having a hub, moving arm, an actuating arm, and at least two linear actuators, comprising: configuring a processor to: receive sensor data from linear actuator sensors located at least one of on and proximate to the linear actuators, determine a first position of the moving arm in relation to the actuating arm, generate a moving arm control signal to actuate the linear actuators, wherein the linear actuators are connected to a flexible mechanical drive system to rotate the hub resulting in a change of position between the actuating arm and the moving arm from a first position to a second position, receive sensor data from the linear actuator sensors to verify the moving arm is in the second position.

Example 17 may include example 16, wherein the processor is located at least one of within the actuating arm, proximate to the actuating arm, and remote to the actuating arm.

Example 18 may include example 16, wherein the hub profile dimensions are less than the largest dimensional profile measurement of the moving arm.

Example 19 may include example 16, wherein the linear actuator sensors are located at least one of on and proximate to the hub.

Example 20 may include example 19, wherein the linear actuator sensors comprise a rotary encoder.

Example 21 may include example 16, wherein one or more cables are passed through the hub.

Example 22 may include example 21, wherein the one or more cables are at least one of power, hydraulic, pneumatic, and communications.

Example 23 may include example 16, wherein the at least two linear actuators are at least one of hydraulic, electric over hydraulic, pneumatic, mechanical, electro-mechanical, piezoelectric, electric, and linear motor actuators.

Example 24 may include example 16, wherein one or more linear actuator sensors comprise one or more of distance and position.

Example 25 may include example 16, wherein the flexible mechanical drive system comprises at least one of cogs, links, chains, and belts.

Example 26 may include example 25, wherein the cogs are machined or cast.

Example 27 may include example 25, wherein chain may be leaf, link, or roller.

Example 28 may include example 16, wherein the moving arm has a range of motion of 180° perpendicular to a central axis of the actuating arm.

Example 29 may include example 16, wherein data transfer is wired or wireless.

Example 30 may include a hub for a mechanical joint connecting an actuating arm to a moving arm, comprising: a body section including an outside surface; a first and second side for attaching to the actuating arm and the moving arm; and a slot extending through the body section configured to receive cables, the cables extending from the actuating arm through the slot into the moving arm.

Example 31 may include the hub of example 30, wherein the slot forms a first cable guide opening extending into the moving arm and a second opening extending into the actuating arm.

Example 32 may include the hub of example 31, further including a link connector attaching to the body section, the link connector including a passage aligning with the first cable guide opening.

Example 33 may include the hub of example 30, wherein the outside surface of the body section is round and the slot forms a first opening that extends at least 180 degrees around a first portion of the outside surface and forms a second cable guide opening that extends out from a second portion of the outside surface.

Example 34 may include the hub of example 33, wherein the slot forms two rounded inside surfaces in the body section that extend from opposite sides of the first opening to opposite sides of the second cable guide opening.

Example 35 may include the hub of example 33, including a link connector attaching the second portion of the outside surface and including a passage that aligns with the second cable guide opening.

Example 36 may include the hub of example 34, wherein the cable guide opening and the central passage each comprise multiple holes configured to receive the cables.

Example 37 may include the hub of example 30, wherein the first and second side of the hub are rigidly attached to the moving arm and rotatably attached to the actuating arm.

Example 38 may include the hub of example 37, wherein the actuating arm includes inner ears with holes for receiving and rotatably attaching the first and second side of the hub and the moving arm includes outer ears extending over the inner ears for rigidly attaching to the first and second side of the hub.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

It should be apparent that the modifications in arrangement and detail can be made without departing from the principles of the embodiments disclosed in the specification. Claim is made to all modifications and variation coming within the spirit and scope of the following claims.

The invention claimed is:

1. A mechanical joint mounted between an actuating arm and a moving arm, comprising:
    a hub having a cable routing passage configured to receive a cable passing through the hub from the actuating arm to the moving arm, the hub including a body section including an outside surface, a first and second side for attaching to the actuating arm and the moving arm, and a slot extending through the body section configured to receive the cable;
    one or more linear actuators connected to a flexible mechanical drive system wherein the flexible mechanical drive system includes first and second flexible drive devices having first ends coupled to the one or more linear actuators and second ends configured to rotate the hub about its central axis resulting in a change of position between the actuating arm and the moving arm from a first position to a second position; and
    a link connector extending from the outside surface of the hub and attached on opposite sides to the second ends of the first and second flexible drive devices, the link connector including a passage aligned over the slot and the cable extends from the actuating arm through the slot and through the passage in between the second ends of the first and second flexible mechanical drive devices.

2. The system of claim 1, further comprising a processor configured to:
    receive sensor data from a linear actuator sensor configured to determine the positions of the linear actuators,
    determine the first position of the moving arm with respect to the actuating arm,
    generate a moving arm control signal to actuate the linear actuators connected to the flexible mechanical drive system to rotate the hub to change the position between the actuating arm and the moving arm from the first position to the second position, and
    receive sensor data from the linear actuator sensor to verify the moving arm is in the second position.

3. The system of claim 2, wherein the processor is located within the actuating arm.

4. The system of claim 1, wherein the first and second flexible drive devices comprise two chains each coupled at the first ends to different ones of the linear actuators and coupled at the second ends to the opposite sides of the link connector.

5. The system of claim 4, wherein widths of the second ends of the two chains extend substantially over an entire width of the outside surface of the hub.

6. The system of claim 2, wherein the cable is at least one of power cable, hydraulic cable, pneumatic cable, or communications cable.

7. The system of claim 2, wherein the linear actuators are at least one of hydraulic, electric over hydraulic, pneumatic, mechanical, electro-mechanical, piezoelectric, electric, and linear motor actuators.

8. The system of claim 2, wherein the linear actuator sensor is configured to identify a distance of movement of the moving arm and a position of the moving arm.

9. The system of claim 2, wherein the flexible mechanical drive system comprises at least one of cogs, links, chains, or belts.

10. The system of claim 9, wherein the chains comprise leaf chains, link chains, or roller chains.

11. The system of claim 1, wherein the slot in the hub extends around an outside perimeter of the hub over 180 degrees to enable the moving arm to move in a 180 degree range perpendicular to a central axis of the actuating arm.

12. The system of claim 2, including a wireless transmitter coupled to the processor configured to wirelessly transmit the sensor data to a controller outside of the actuating arm and the moving arm.

13. The system of claim 2, including a wireless transmitter coupled to the linear actuators configured to wirelessly transmit the sensor data to the processor.

14. An apparatus for operation and control of a mechanical joint having a hub, moving arm, an actuating arm, and linear actuators, comprising:
    a processing unit;
    a memory device coupled to the processing unit, the memory device having instructions stored thereon that, in response to execution by the processing unit, are operable to:

receive sensor data from a position sensor located proximate to the linear actuators, determine a first position of the moving arm in relation to the actuating arm, generate a moving arm control signal to actuate the linear actuators, wherein the linear actuators are connected to associated flexible drive devices that rotate the hub and move the moving arm from the first position in relation to the actuating arm to a second position in relation to the actuating arm; and receive sensor data from the position sensor to verify the moving arm is in the second position, wherein:

a cable routing passage extends through the hub from the actuating arm to the moving arm, a link connector extends from the hub, a first end of a first one of the flexible drive devices attaches to a first side of the link connector, a second end of a second one of the flexible drive devices attaches to a second side of the link connector, the link connector includes an opening aligned over the cable routing passage, and a cable extends from the actuating arm through the opening and through the cable routing passage in between the first end of the first one of the flexible drive devices and the second end of the second one of the flexible drive devices.

15. The apparatus of claim 14, wherein the hub includes:
a body section including an outside surface, and
a first and second side for attaching to the actuating arm and the moving arm, wherein a width of the first and second one of the flexible drive devices extends over substantially an entire width of the body section between the first and second side.

16. The apparatus of claim 14, wherein the hub has a cross-sectional dimension no greater than a largest cross-sectional dimension of the moving arm.

17. The apparatus of claim 15, wherein:
the outside surface of the body section of the hub is round and the cable routing passage forms a first opening that extends at least 180 degrees around a first portion of the outside surface and forms a second cable guide opening that extends out from a second portion of the outside surface; and
the cable routing passage forms two rounded inside surfaces in the body section that extend from opposite sides of the first opening to opposite sides of the second cable guide opening.

18. The apparatus of claim 14, wherein the position sensor comprises a rotary encoder.

19. The apparatus of claim 14, wherein the cable routing passage includes a central channel that extends from the actuating arm to the moving arm configured to receive the cable.

20. The apparatus of claim 19, wherein the central channel extends around a perimeter of the hub over 180 degrees from the actuating arm to the moving arm.

21. The apparatus of claim 19, wherein the cable includes at least one of power, hydraulic, pneumatic, or communications cable.

22. The apparatus of claim 14, wherein the linear actuators comprise a hydraulic, electric over hydraulic, pneumatic, mechanical, electro-mechanical, piezoelectric, electric, or linear motor actuators.

23. The apparatus of claim 14, wherein the first and second one of the flexible drive devices each comprise at least one of a leaf chain, link chain, or roller chain.

24. The apparatus of claim 14, including a wireless receiver connected to the processing unit configured to wirelessly receive the sensor data from the position sensor.

25. The apparatus of claim 14, including a wireless transmitter connected to the processing unit configured to wirelessly transmit the sensor data to a controller outside of the actuating arm and the moving arm.

* * * * *